United States Patent
Kushnir et al.

(10) Patent No.: US 12,381,319 B2
(45) Date of Patent: Aug. 5, 2025

(54) SYSTEM AND METHOD FOR LONG-RANGE WIRELESS POWER TRANSFER

(71) Applicant: EMROD LIMITED, Auckland (NZ)

(72) Inventors: Zvi Kushnir, Auckland (NZ); Raymond Andrew Simpkin, Auckland (NZ)

(73) Assignee: Emrod Limited, Auckland (NZ)

( * ) Notice: Subject to any disclaimer, the term of this patent is extended or adjusted under 35 U.S.C. 154(b) by 79 days.

(21) Appl. No.: 17/775,963

(22) PCT Filed: Nov. 11, 2020

(86) PCT No.: PCT/IB2020/060595
§ 371 (c)(1),
(2) Date: May 11, 2022

(87) PCT Pub. No.: WO2021/094930
PCT Pub. Date: May 20, 2021

(65) Prior Publication Data
US 2022/0416420 A1    Dec. 29, 2022

Related U.S. Application Data

(60) Provisional application No. 62/934,511, filed on Nov. 12, 2019.

(30) Foreign Application Priority Data

Nov. 12, 2019    (AU) .............................. 2019904254

(51) Int. Cl.
*H01Q 3/36* (2006.01)
*H01Q 1/42* (2006.01)
(Continued)

(52) U.S. Cl.
CPC .............. *H01Q 3/36* (2013.01); *H01Q 1/42* (2013.01); *H01Q 3/28* (2013.01); *H01Q 15/14* (2013.01);
(Continued)

(58) Field of Classification Search
CPC ................................. H02J 50/00; H01Q 3/00
See application file for complete search history.

(56) References Cited

U.S. PATENT DOCUMENTS 6,043,779 A * 3/2000 Lalezari ............... H01Q 25/002
342/372
6,208,287 B1 * 3/2001 Sikina ..................... H01Q 3/267
342/372
(Continued)

FOREIGN PATENT DOCUMENTS

| CN | 201556706 U | 8/2010 |
| CN | 206340676 U | 7/2017 |

(Continued)

OTHER PUBLICATIONS

R. M. Dickinson, 'The Beamed Power Microwave Transmitting Antenna,' IEEE Transactions on Microwave Theory and Techniques, vol. MTT-26, No. 5, pp. 335-340; Publication date: May 1978 Retrieved from: https://ieeexplore.ieee.org/document/1129383.
(Continued)

*Primary Examiner* — Rexford N Barnie
*Assistant Examiner* — Joseph N Inge
(74) *Attorney, Agent, or Firm* — PEARL COHEN ZEDEK LATZER BARATZ LLP

(57) ABSTRACT

A long-range wireless power transfer system 100 is disclosed. The system 100 comprises at least a transmitting antenna 110 that is configured to receive electric power from a power source as an input, convert the input electric power
(Continued)

into electromagnetic energy, and radiate the electromagnetic energy into free space as a directional beam that is a collimated or substantially collimated beam. The rectifying antenna 130 is positioned or configured to be positioned at a distance from the transmitting antenna 110. The rectifying antenna 130 is configured to receive the directional beam and convert the electromagnetic energy into electricity. In certain embodiments, the system 100 utilise one or more phase correcting devices 120, 122 to maintain the directional beam as the collimated beam and to increase a range to which the directional beam is maintained as the collimated or substantially collimated beam.

25 Claims, 15 Drawing Sheets

(51) Int. Cl.
*H01Q 3/28* (2006.01)
*H01Q 15/14* (2006.01)
*H02J 50/23* (2016.01)
*H02J 50/27* (2016.01)
*H02J 50/40* (2016.01)
*H02J 50/50* (2016.01)

(52) U.S. Cl.
CPC .............. *H02J 50/23* (2016.02); *H02J 50/27* (2016.02); *H02J 50/40* (2016.02); *H02J 50/50* (2016.02)

(56) References Cited

U.S. PATENT DOCUMENTS

| | | | |
|---|---|---|---|
| 7,888,586 B2 | 2/2011 | Yamamoto et al. | |
| 8,994,221 B2 | 3/2015 | Sedwick | |
| 9,450,310 B2 | 9/2016 | Bily et al. | |
| 9,871,291 B2 | 1/2018 | Chen et al. | |
| 10,135,123 B1 | 11/2018 | Arnitz et al. | |
| 10,135,257 B1 | 11/2018 | Adolf et al. | |
| 10,211,674 B1 | 2/2019 | Leabman et al. | |
| 10,249,950 B1 | 4/2019 | Arnitz et al. | |
| 10,389,179 B2 | 8/2019 | Hannigan et al. | |
| 10,425,837 B2 | 9/2019 | Urzhumov et al. | |
| 10,727,601 B1* | 7/2020 | Akselrod ........... | H01Q 15/0053 |
| 2011/0193566 A1 | 8/2011 | Nyshadham et al. | |
| 2012/0154227 A1* | 6/2012 | Adlerstein ......... | H01Q 21/0006 343/703 |
| 2012/0274147 A1 | 11/2012 | Stecher et al. | |
| 2012/0281843 A1 | 11/2012 | Christensen et al. | |
| 2018/0287262 A1 | 10/2018 | Patri et al. | |
| 2018/0323657 A1 | 11/2018 | Hannigan et al. | |
| 2018/0337444 A1* | 11/2018 | Arnitz ............... | H01Q 15/0086 |
| 2019/0140350 A1 | 5/2019 | Urzhumov et al. | |
| 2019/0140701 A1 | 5/2019 | Greason | |
| 2019/0173324 A1 | 6/2019 | Arnitz et al. | |
| 2020/0028262 A1* | 1/2020 | Fang ................. | H01Q 3/46 |

FOREIGN PATENT DOCUMENTS

| | | |
|---|---|---|
| CN | 107026331 A | 8/2017 |
| CN | 110098669 A | 8/2019 |
| EP | 3496231 A1 | 6/2019 |
| IN | 359874 | 10/2011 |
| JP | 2014-518059 | 7/2014 |
| JP | 2018-082568 | 5/2018 |
| JP | A 2018-201283 | 12/2018 |
| JP | 2019-530387 | 10/2019 |
| KR | 10-2014-0036201 | 3/2014 |
| NZ | 556602 | 5/2010 |
| NZ | 600158 | 8/2014 |
| NZ | 741328 | 10/2019 |
| WO | WO 2014/170773 A2 | 10/2014 |
| WO | WO 2014/194061 A2 | 12/2014 |

OTHER PUBLICATIONS

J. O. McSpadden and J. C. Mankins, Space solar power programs and microwave wireless power transmission technology, IEEE Microwave Magazine, vol. 3, No. 4, pp. 46-57; Publication date: Dec. 2002. Retrieved from: https://ieeexplore.ieee.org/application/enterprise/entconfirmation.jsp?arnumber=1145675&icp=false.

Guy Lipworth et al., 'Magnetic Metamaterial Superlens For Increased Range Wireless Power Transfer', Scientific Reports, pp. 1-6; Publication date: Jan. 2014 Retrieved from: https://www.nature.com/articles/srep03642.pdf.

Massa A et al. 'ArrayDesigns for Long-Distance Wireless Power Transmission: State-of-the-Art and Innovative Solutions', Proceedings of the IEEE, vol. 101, No. 6; Publication date: Jun. 2013.

C. T. Rodenbeck et al., "Microwave and Millimeter Wave Power Beaming," in IEEE Journal of Microwaves, vol. 1, No. 1, pp. 229-259, doi: 10.1109/JMW.2020.3033992.; Publication date: Jan. 2021.

C. T. Rodenbeck et al., "Terrestrial Microwave Power Beaming," in IEEE Journal of Microwaves, vol. 2, No. 1, pp. 28-43; doi: 10.1109/JMWV.2021.3130765. Publication date: Jan. 2022.

Search Report for European Patent Application No. 20887432.1 dated Nov. 9, 2023.

* cited by examiner

SYSTEM AND METHOD FOR LONG-RANGE WIRELESS POWER TRANSFER

CROSS-REFERENCE TO RELATED APPLICATIONS

This application is a National Phase Application of PCT International Application No. PCT/IB2020/060595, International Filing Date Nov. 11, 2020, claiming the benefit of U.S. Provisional Patent Application(s) No. 62/934,511, filed Nov. 12, 2019 and Australian Patent Application No. AU 2019904254, filed Nov. 12, 2019, all of which are hereby incorporated by reference.

BACKGROUND OF THE INVENTION

Transmitting electricity using transmission lines is well-known.

However, transmitting power using transmission lines/cables have several disadvantages. Laying power cables can be expensive as it requires substantial labour, equipment and land area. Further, installing and maintaining power cables can be costly. In addition, transmission lines cannot be easily implemented in all geographical locations. Overhead transmission lines are not aesthetically pleasing and can be damaged for example in severe weather conditions. Although, underground power cables may solve some of these problems, they too have several disadvantages such as difficulty in detecting faults, and are difficult and expensive to upgrade.

One of the problems with transferring power wirelessly using electromagnetic beams over a long distance is ability to transfer power in an efficient manner because electromagnetic waves can easily diverge in other directions during transmission of energy from a transmitting end to a receiving end, thereby causing loss of much of the energy in free space. This means the energy received at the receiving end may not be sufficient to provide power or be economically viable compared to physical line-based alternatives.

OBJECT OF THE INVENTION

It is an object of the present invention to provide a system and/or method for a long-range wireless power transfer which overcomes or at least partially ameliorates some of the abovementioned challenges, augments the current line-based solutions, or which at least provides the public with a useful choice.

SUMMARY OF INVENTION

In a first aspect, the present invention resides in a long-range wireless power transfer system comprising:
  a transmitting antenna that is a phased array antenna having an array of antenna elements that are radiating elements, the phased array antenna being configured to receive electric power from a power source as an input, convert the input electric power into electromagnetic energy, and radiate the electromagnetic energy into free space as a directional beam that is a collimated or substantially collimated beam, the collimated or substantially collimated beam being produced by controlling phase and amplitude of each of the antenna elements;
  at least one phase correcting device positioned or configured to be positioned at a first distance from the transmitting antenna, the at least one phase correcting device being a multi-layer structure having at least three layers with a central dielectric core sandwiched between at least two layers on two opposite portions of the dielectric core with at least one of the layers being a dielectric skin made of at least one dielectric material, the at least one phase correcting device being configured to:
  receive the directional beam radiated from the transmitting antenna,
  perform a phase correcting operation on the directional beam, the phase correcting operation being maintaining the directional beam as the collimated or substantially collimated beam and increasing a range to which the directional beam is maintained as the collimated or substantially collimated beam, and
  transmit the phase corrected directional beam to the free space; and
  a rectifying antenna positioned or configured to be positioned at a second distance from the transmitting antenna with the at least one phase correcting device positioned or configured to be positioned between the transmitting antenna and the rectifying antenna, the rectifying antenna configured to receive the directional beam from the at least one phase correcting device and convert the electromagnetic energy into electricity.

In a second aspect, the present invention resides in a long-range wireless power transfer system comprising:
  a transmitting antenna configured to receive electric power from a power source as an input, convert the input electric power into electromagnetic energy, and radiate the electromagnetic energy into free space as a directional beam that is a collimated or substantially collimated beam;
  at least one phase correcting device positioned or configured to be positioned at a first distance from a transmitting antenna, the at least one phase correcting device being configured to:
  receive the directional beam radiated from the transmitting antenna,
  perform a phase correcting operation on the directional beam for maintaining the directional beam as the collimated or substantially collimated beam and for increasing a range to which the directional beam is maintained as the collimated or substantially collimated beam, and
  transmit the phase corrected directional beam to the free space; and
  a rectifying antenna positioned or configured to be positioned at a second distance from the transmitting antenna with the at least one phase correcting device positioned or configured to be positioned between the transmitting antenna and the rectifying antenna, the rectifying antenna configured to receive the directional beam from the at least one phase correcting device and convert the electromagnetic energy into electricity.

One or more following statements may apply to the invention as defined above in the first and/or second aspects.

In one embodiment, the electromagnetic energy is a microwave energy.

In one embodiment, the transmitting antenna is a phased array antenna having an array of antenna elements that are radiating elements and the collimated or substantially collimated beam is produced by controlling phase and amplitude of each of the antenna elements.

In one embodiment, each antenna element has an electronically controlled phase shifter to facilitate electronic steering of the directional beam.

In one embodiment, each antenna element is a patch antenna element.

In one embodiment, each antenna element is made from metallic segments etched onto a substrate.

In one embodiment, each antenna element comprises at least a low-loss dielectric element made out of a low-loss dielectric material.

In one embodiment, each antenna element is a radome element formed as a hemispherical shell or a substantially hemispherical shell.

In one embodiment, the radome element has a thin radome element wall with a wall thickness of no more than one quarter of a wavelength in a material that the radome element wall is made of.

In one embodiment, the wavelength of the electromagnetic energy in a form of electromagnetic waves in the material that the radome element wall is made of is given by:

$$\lambda_d = \frac{\lambda}{n_d}$$

where $\lambda_d$ is the wavelength of electromagnetic waves in the radome wall material, is the free-space wavelength and $n_d$ is the refractive index of the radome wall material.

In one embodiment, the radome element is larger than the antenna element to cover the antenna element.

In one embodiment, the at least one phase correcting device is an electromagnetic wave transparent phase correcting device.

In one embodiment, the at least one phase correcting device is a straight through phase correcting device that allows the directional beam that is incident on it to travel through in a straight direction without diverting the directional beam into another direction.

In one embodiment, the straight-through phase correcting device is a composite multi-layer structure comprising at least three layers with a or the dielectric core sandwiched between at least two dielectric skins on two opposite portions of the dielectric core.

In one embodiment, the dielectric skins comprise metasurfaces to simultaneously provide phase shift whilst maintaining an impedance matched structure with minimal loss of power.

In one embodiment, the metasurfaces are incorporated on the dielectric skins.

In one embodiment, thickness of the dielectric skin on each portion of the dielectric core is less than one-tenth of a wavelength in a material that the dielectric skin is made of.

In one embodiment, the dielectric core is made from a low-loss dielectric material.

In one embodiment, a or the dielectric core is of at least three layers with at least one metamaterial layer sandwiched between two dielectric support layers.

In one embodiment, the at least one metamaterial layer is a metasurface.

In one embodiment, thickness of the dielectric core is between one-tenth and one whole wavelength in the dielectric material that the dielectric core is made of.

In one embodiment, the dielectric core has a refractive index between 1 and 3.

In one embodiment, the at least one phase correcting device is a reflective phase correcting device that allows the directional beam to divert to another direction at an angle by reflecting the directional beam that is incident on the reflective phase correcting device into said another direction.

In one embodiment, the angle is between 60 degrees and 120 degrees, preferably, 90 degrees or substantially 90 degrees.

In one embodiment, the reflective phase correcting device is a composite multi-layer structure having at least three layers with a or the dielectric core sandwiched between a dielectric skin on a first portion of the dielectric core and a reflective ground plane on a second portion of the dielectric core, the second portion being opposite the first portion.

In one embodiment, in the reflective phase correcting device, the dielectric core is sandwiched between the at least two layers on two opposite portions of the dielectric core with at least one of the layers being the dielectric skin the other layer being a reflective ground plane In one embodiment, the dielectric skin comprises a metasurface to simultaneously provide phase shift to an incoming wavefront and complete reflection with minimal loss of power.

In one embodiment, the transmitting antenna has a transmitting antenna aperture.

In one embodiment, the transmitting antenna aperture has a dimension, D, aperture efficiency, E, such that for wavelength, $\lambda$, and distance, R, between transmitting antenna and down-range phase-correcting device or rectenna, at least one of the following inequalities apply:

$$D^2 \geq 4\lambda R/\epsilon$$

$$D^2 \geq \pi\lambda R/\epsilon$$

In one embodiment, $D^2 \geq 4\lambda R/\epsilon$ applies for a circular aperture of diameter, D.

In one embodiment, $D^2 \geq \pi\lambda R/\epsilon$ applies for a square aperture of side dimension, D.

In one embodiment, size of the rectifying antenna is same or substantially the same as the size of the transmitting antenna aperture.

In one embodiment, the rectifying antenna is part of a rectifying antenna structure comprising solid state rectifying components wherein the rectifying antenna comprises an array of receiving antenna elements that are electrically connected to the solid-state rectifying components.

In one embodiment, the solid-state rectifying components are Schottky diodes.

In one embodiment, the rectifying antenna is part of a rectifying antenna structure, the rectifying antenna structure comprising:

a central core having a first portion and a second portion that are opposite to each other, wherein the central core is made of at least one dielectric material;

a dielectric skin comprising a metasurface disposed to a first portion of the central core and the rectifying antenna is positioned at the second portion of the central core; and a rectifying circuit that is electrically connected to the rectifying antenna to rectify the incoming electromagnetic e energy to produce a direct current (DC) output which is then delivered to a required load.

In one embodiment, the rectifying antenna is formed as a rectifying antenna array having a plurality of rectifying antenna elements.

In one embodiment, the central core is made of a low-loss dielectric material.

In one embodiment, thickness of the central core lies between one-tenth and one whole wavelength in the dielectric material that the central core is made of.

In one embodiment, the central core has a refractive index of between 1 and 3

In one embodiment, thickness and refractive index of the central core vary over the surface of the rectifying antenna to achieve impedance match that is desired.

In one embodiment, the system is an earth-based system.

In one embodiment, the system is configured to wirelessly transfer the power up to and beyond 100 meters range.

In one embodiment, the transmitting antenna is configured to operate in a radiating near-field region within which an electromagnetic field is substantially confined to the collimated or substantially collimated beam.

In one embodiment, the transmitting antenna is configured to operate in a radiating near-field region within which an electromagnetic field is substantially confined to the collimated or substantially collimated beam, by applying a spherical phase distribution across an aperture plane of the transmitting antenna so as to achieve a degree of beam focusing in the radiating near-field region.

In one embodiment, in the radiating near-field region, the maximum on-axis field strength exceeds that in the or an antenna aperture due to constructive interference, and occurs at a range, $R_{max}$ wherein for antenna array elements being excited in-phase, the value of $R_{max}$ is given by:

$$R_{max} = \frac{A_{eff}}{\pi \lambda}$$

where, $\lambda$ is the wavelength of radiation and $A_{eff}$ is the effective area of the transmitting antenna aperture.

In a third aspect, the present invention resides in a long-range wireless power transfer system, the system comprising:

a transmitting antenna that is a phased array antenna having an array of antenna elements that are radiating elements, the phase array antenna being configured to receive an electric power from a power source as an input, convert the input electric power into electromagnetic energy, and radiate the electromagnetic energy into free space as a directional beam that is a collimated or substantially collimated beam, the collimated or substantially collimated beam being produced by controlling phase and amplitude of each of the antenna elements;

at least one phase correcting device positioned or configured to be positioned at a first distance from the transmitting antenna, the at least one phase correcting device being configured to:

receive the directional beam radiated from the transmitting antenna, perform a phase correcting operation on the directional beam for maintaining the directional beam as the collimated or substantially collimated beam and for increasing a range to which the directional beam is maintained as the collimated or substantially collimated beam, and transmit the phase corrected directional beam to the free space; and a rectifying antenna positioned or configured to be positioned at a second distance from the transmitting antenna with the at least one phase correcting device positioned or configured to be positioned between the transmitting antenna and the rectifying antenna, the rectifying antenna configured to receive the directional beam from the at least one phase correcting device and convert the electromagnetic energy into electricity, wherein the at least one phase correcting device utilises at least one metasurface to provide phase shift whilst maintaining an impedance matched structure with minimal loss of power.

In a fourth aspect, the present invention resides in a long-range wireless power transfer system, the system comprising:

a transmitting antenna that is configured to receive an electric power from a power source as an input, convert the input electric power into electromagnetic energy, and radiate the electromagnetic energy into free space as a directional beam that is a collimated or substantially collimated beam;

at least one phase correcting device positioned or configured to be positioned at a first distance from a transmitting antenna, the at least one phase correcting device being configured to:

receive the directional beam radiated from the transmitting antenna, perform a phase correcting operation on the directional beam for maintaining the directional beam as the collimated or substantially collimated beam and for increasing a range to which the directional beam is maintained as the collimated or substantially collimated beam, and transmit the phase corrected directional beam to the free space; and a rectifying antenna positioned or configured to be positioned at a second distance from the transmitting antenna with the at least one phase correcting device positioned or configured to be positioned between the transmitting antenna and the rectifying antenna, the rectifying antenna configured to receive the directional beam from the at least one phase correcting device and convert the electromagnetic energy into electricity, wherein the at least one phase correcting device utilises at least one metasurface to provide phase shift whilst maintaining an impedance matched structure with minimal loss of power.

One or more following statements may apply to the invention as defined above in the third and fourth aspects.

In one embodiment, the electromagnetic energy is a microwave energy.

In one embodiment, the at least one phase correcting device utilises at least two metasurfaces to provide phase shift whilst maintaining an impedance matched structure with minimal loss of power.

In one embodiment, the at least one phase correcting device utilises at least three metasurfaces to provide phase shift whilst maintaining an impedance matched structure with minimal loss of power.

In one embodiment, the at least one phase correcting device is a multi-layer structure having at least three layers with a central dielectric core sandwiched between at least two layers on two opposite portions of the dielectric core with at least one of the layers being a dielectric skin made of at least one dielectric material. In one embodiment, the dielectric skins comprise metasurfaces to simultaneously provide phase shift whilst maintaining an impedance matched structure with minimal loss of power.

In one embodiment, the metasurfaces are incorporated on the dielectric skins.

In one embodiment, thickness of the dielectric skin on each portion of the dielectric core is less than one-tenth of a wavelength in a material that the dielectric skin is made of.

In one embodiment, the dielectric core is made from a low-loss dielectric material.

In one embodiment, a or the dielectric core is of at least three layers with at least one metamaterial layer sandwiched between two dielectric support layers.

In one embodiment, the at least one metamaterial layer is a metasurface.

In one embodiment, the system is the one as defined by any one of the statements above and below. One or more statements relating to any one of the first and second aspects as defined above may equally apply to the invention das defined in the third and the fourth aspects.

In a fifth aspect, the present invention resides in a long-range wireless power transfer system that utilises at least one metasurface to provide phase shift whilst maintaining an impedance matched structure with minimal loss of power.

In one embodiment, the long-range wireless power transfer system utilises at least two metasurfaces to provide phase shift whilst maintaining an impedance matched structure with minimal loss of power.

In one embodiment, the long-range wireless power transfer system utilises at least three metasurfaces to provide phase shift whilst maintaining an impedance matched structure with minimal loss of power.

In one embodiment, the system is the one as defined by one or more of the statements above and below. One or more statements relating to any one of the first to fourth aspects as defined above may equally apply to the invention as defined in the fifth aspect.

In a sixth aspect, the present invention resides in a use of at least one metasurface (preferably at least two metasurfaces) to provide phase shift whilst maintaining an impedance matched structure with minimal loss of power in a long-range wireless power transfer system.

In one embodiment, the system is the one as defined by one or more of the statements above and below. One or more statements relating to any one of the first to fifth aspects as defined above may equally apply to the invention as defined in the sixth aspects.

In a seventh aspect, the present invention resides in a transmitting antenna for use in a long-range wireless power transfer system,
wherein the transmitting antenna is a phased array antenna having an array of antenna elements that are radiating elements.

In one embodiment, each antenna element comprises at least a low-loss dielectric element made out of a low-loss dielectric material.

In one embodiment, each antenna element is a radome element formed as a hemispherical shell or a substantially hemispherical shell.

In one embodiment, each antenna element is a radome element formed as a hemispherical shell or a substantially hemispherical shell.

In one embodiment, the radome element has a thin radome element wall with a wall thickness of no more than one quarter of a wavelength in a material that the radome element is made of.

In one embodiment, the radome element is larger than each antenna element to cover the antenna element.

In one embodiment, each antenna element has an electronically controlled phase shifter to facilitate electronic steering of the directional beam.

In one embodiment, each antenna element is a patch antenna element.

In one embodiment, each antenna element is made from metallic segments etched onto a substrate.

In one embodiment, the transmitting antenna is configured to receive electric power from a power source as an input, convert the input electric power into electromagnetic energy, and radiate the electromagnetic energy into free space as a directional beam that is a collimated or substantially collimated beam.

In one embodiment, the transmitting antenna has a transmitting antenna aperture.

In one embodiment, the transmitting antenna aperture has a dimension, D, aperture efficiency, $\epsilon$, such that for wavelength, X, and distance, R, between transmitting antenna and down-range phase-correcting device or rectenna, at least one of the following inequalities apply:

$$D^2 \geq 4\lambda R/\epsilon$$

$$D^2 \geq \pi\lambda R/\epsilon$$

In one embodiment, $D^2 \geq 4\lambda R/\epsilon$ applies for a circular aperture of diameter, D.

In one embodiment, $D^2 \geq \pi\lambda R/\epsilon$ applies for a square aperture of side dimension, D.

In one embodiment, the system is the one as defined by one or more of the statements above and below. One or more statements relating to any one of the first to sixth aspects as defined above may equally apply to the invention as defined in the seventh aspect.

In an eighth aspect, the present invention resides in a phase correcting device for use in a long-range wireless power transfer system, wherein the phase correcting device is a multi-layer structure having at least three layers with a central dielectric core sandwiched between at least two layers on two opposite portions of the dielectric core with at least one of the layers being a dielectric skin made of at least one dielectric material.

In one embodiment, the dielectric skin comprises a metasurface to provide phase shift whilst maintaining an impedance matched structure with minimal loss of power.

In one embodiment, the metasurface is incorporated on the dielectric skin.

In one embodiment, the phase correcting device is an electromagnetic wave transparent phase correcting device.

In one embodiment, thickness of the dielectric skin is less than one tenth of a wavelength in the at least one dielectric material that the dielectric skin is made of.

In one embodiment, the dielectric core is made from a low-loss dielectric material.

In one embodiment, thickness of the dielectric core lies between one-tenth and one whole wavelength in the dielectric material that the dielectric core is made of.

In one embodiment, the dielectric core has a refractive index of between 1 and 3.

In one embodiment, the phase correcting device is a straight-through phase correcting device that allows the directional beam that is incident on it to travel through in a straight direction without diverting the directional beam into another direction.

In one embodiment, the central dielectric core is sandwiched between the dielectric skins on both the opposite portions of the dielectric core.

In one embodiment, the phase correcting device is a reflective phase correcting device that allows the directional beam to divert to another direction at an angle by reflecting the directional beam that is incident on the reflective phase correcting device into said another direction.

In one embodiment, the angle is between 60 degrees and 120 degrees, preferably, 90 degrees or substantially 90 degrees.

In embodiment, wherein the central dielectric core is sandwiched between the dielectric skin on the first portion of the dielectric core and a reflective ground plane on the second portion of the dielectric core.

In one embodiment, the dielectric skin comprises a metasurface to simultaneously provide phase shift to an incoming wavefront and complete reflection with minimal loss of power.

In one embodiment, the phase correcting device is configured to receive the directional beam radiated from a transmitting structure, perform phase correcting operation on the directional beam for maintaining the directional beam as the collimated or substantially collimated beam and for increasing a range to which the directional beam is maintained as the collimated or substantially collimated beam, and transmit the phase corrected directional beam to a free space.

In one embodiment, the central dielectric core is of at least three layers with at least one metamaterial layer sandwiched between two dielectric support layers.

In one embodiment, the at least one metamaterial layer is a metasurface.

In one embodiment, the system is one as defined by one or more of the statements above and below. One or more statements relating to any one of the first to seventh aspects as defined above may equally apply to the invention as defined in the eighth aspect.

In a ninth aspect, the present invention resides in a rectifying antenna for use in a long-range wireless power transfer system, wherein the rectifying antenna is part of a rectifying antenna structure comprising solid state rectifying components wherein the rectifying antenna comprises an array of receiving antenna elements that are electrically connected to the solid-state rectifying components.

In one embodiment, the solid-state rectifying components are Schottky diodes.

In one embodiment, the system is one as defined by one or more of the statements above and below. One or more statements relating to any one of the first to eighth aspects as defined above may equally apply to the invention as defined in the ninth aspect.

In a tenth aspect, the present invention resides in a rectifying antenna structure for use in a long-range wireless power transfer system, the rectifying antenna structure comprising:

a central core having a first portion and a second portion that are opposite to each other, wherein the central core is made of at least one dielectric material;

a dielectric skin comprising a metasurface disposed to a first portion of the central core;

a rectifying antenna positioned at the second portion of the central core; and a rectifying circuit that is electrically connected to the rectifying antenna to rectify the incoming electromagnetic energy to produce a direct current (DC) output.

In one embodiment, the rectifying antenna is formed as a rectifying antenna array having a plurality of rectifying antenna elements.

In one embodiment, the central core is made of a low-loss dielectric material.

In one embodiment, thickness of the central core is between one-tenth and one whole wavelength in a dielectric medium of the central core.

In one embodiment, the central core has a refractive index of between 1 and 3.

In one embodiment, the thickness and refractive index of the central core vary over the surface of the rectifying antenna to achieve impedance match that is desired.

In one embodiment, the system is one as defined by one or more of the statements above and below. One or more statements relating to any one of the first to ninth aspects as defined above may equally apply to the invention as defined in the tenth aspect.

In an eleventh aspect, the present invention resides in a long-range wireless power transfer method, the method comprising at least the following steps:

providing a long-range wireless power transfer system comprising a transmitting antenna, at least one phase correcting device and a rectifying antenna that are operatively connected to each other;

using the transmitting antenna to receive an electric power from a power source as an input, convert the input electric power into electromagnetic energy, and radiate the electromagnetic energy into free space as a directional beam that is a collimated or substantially collimated beam;

using the at least one phase correcting device to receive the directional beam radiated from the transmitting antenna, perform phase correcting operation on the directional beam for maintaining the directional beam as the collimated or substantially collimated beam and for increasing a range to which the directional beam is maintained as the collimated or substantially collimated beam, and transmit the phase corrected directional beam to the free space; and using the rectifying antenna to receive the directional beam from the at least one phase correcting device and convert the electromagnetic energy into electricity.

In one embodiment, the method further comprises positioning the at least one phase correcting device positioned between the transmitting antenna and the rectifying antenna.

In one embodiment, the method further comprises positioning the at least one phase correcting device at or near a distance from the transmitting antenna at which the directional beam starts to diverge.

In one embodiment, the system is an earth-based system.

In one embodiment, the system is configured to wirelessly transfer the power up to and beyond 100 meters.

In one embodiment, the transmitting antenna is the one as at defined in any one of the above statements.

In one embodiment, the at least one phase correcting device is the one as at defined in any one of the above statements.

In one embodiment, the rectifying antenna is the one as defined in any one of the above statements.

In one embodiment, the system is the one as defined in any one of the above statements. One or more statements relating to any one of the first to tenth aspects as defined above may equally apply to the invention as defined in the eleventh aspect.

In a twelfth aspect, the present invention may be said to consist of a long-range wireless power transfer system comprising:

a transmitting antenna that is a phase array antenna having an array of antenna elements that are radiating elements, the transmitting antenna being configured to receive electric power from a power source as an input, convert the input electric power into electromagnetic energy, and radiate the electromagnetic energy into free space as a directional beam that is a collimated or substantially collimated beam, wherein the collimated or substantially collimated beam is configured to be produced by controlling phase and amplitude of each of the antenna elements; and a rectifying antenna positioned or configured to be positioned at a distance from the transmitting antenna, the rectifying antenna configured to receive the directional beam and convert the electromagnetic energy into electricity, wherein each antenna element comprises a radome element formed as a hemispherical shell or a substantially hemispherical shell.

In a thirteenth aspect, the present invention may be said to consist of a long-range wireless power transfer system comprising:

a transmitting antenna that is configured to receive electric power from a power source as an input, convert the input electric power into electromagnetic energy, and radiate the electromagnetic energy into free space as a directional beam that is a collimated or substantially collimated beam; and a rectifying antenna positioned or configured to be positioned at a distance from the transmitting antenna, the rectifying antenna configured to receive the directional beam and convert the electromagnetic energy into electricity, wherein, the transmitting antenna is a phased array antenna having an array of antenna elements that are radiating elements, each antenna element comprises a radome element formed as a hemispherical shell or a substantially hemispherical shell.

One or more following statements may apply to the invention as defined above in the twelfth and thirteenth aspects.

In one embodiment, the electromagnetic energy is a microwave energy.

In one embodiment, the collimated or substantially collimated beam is produced by controlling phase and amplitude of each of the antenna elements.

In one embodiment, each antenna element has an electronically controlled phase shifter to facilitate electronic steering of the directional beam.

In one embodiment, each antenna element comprises at least a low-loss dielectric element made out of a low-loss dielectric material.

In one embodiment, each antenna element is a patch antenna element.

In one embodiment, each antenna element is made from metallic segments etched onto a substrate.

In one embodiment, the radome element has a thin radome element wall with a wall thickness of no more than one quarter of a wavelength in a material that the radome element wall is made of.

In one embodiment, the wavelength of the electromagnetic energy in a form of electromagnetic waves in the material that the radome element wall is made of is given by:

$$\lambda_d = \frac{\lambda}{n_d}$$

where $\lambda_d$ is the wavelength of electromagnetic waves in the radome wall material, $\lambda$ is the free-space wavelength and $n_d$ is the refractive index of the radome wall material.

In one embodiment, the radome element is larger than each antenna element to cover the antenna element.

In one embodiment, the transmitting antenna has a transmitting antenna aperture.

In one embodiment, the transmitting antenna aperture has a dimension, D, aperture efficiency, E, such that for wavelength, X, and distance, R, between transmitting antenna and down-range phase-correcting device or rectenna, at least one of the following inequalities apply:

$$D^2 \geq 4\lambda R/\epsilon$$

$$D^2 \geq \pi\lambda R/\epsilon$$

In one embodiment, $D^2 \geq 4\lambda R/\epsilon$ applies for a circular aperture of diameter, D.

In one embodiment, $D^2 \geq \pi\lambda R/\epsilon$ applies for a square aperture of side dimension, D.

In one embodiment, size of the rectifying antenna is same or substantially the same as the size of the transmitting antenna aperture.

In one embodiment, the rectifying antenna is part of a rectifying antenna structure comprising solid state rectifying components wherein the rectifying antenna comprises an array of receiving antenna elements that are electrically connected to the solid-state rectifying components.

In one embodiment, the solid-state rectifying components are Schottky diodes.

In one embodiment, the rectifying antenna is part of a rectifying antenna structure, the rectifying antenna structure comprising:

a central core having a first portion and a second portion that are opposite to each other, wherein the central core is made of at least one dielectric material;

a dielectric skin comprising a metasurface disposed to a first portion of the central core and the rectifying antenna is positioned at the second portion of the central core; and a rectifying circuit that is electrically connected to the rectifying antenna to rectify the incoming electromagnetic energy to produce a direct current (DC) output.

In one embodiment, the rectifying antenna is formed as a rectifying antenna array having a plurality of rectifying antenna elements.

In one embodiment, the central core is made of a low-loss dielectric material.

In one embodiment, thickness of the central core lies between one-tenth and one whole wavelength in the dielectric material that the central core is made of.

In one embodiment, the central core has a refractive index of between 1 and 3.

In one embodiment, thickness and refractive index of the central core vary over the surface of the rectifying antenna to achieve impedance match that is desired.

In one embodiment, the system further comprises at least one phase correcting device positioned or configured to be positioned between the transmitting antenna and the rectifying antenna, the at least one phase correcting device being configured to:

receive the directional beam radiated from the transmitting antenna, perform phase correcting operation on the directional beam for maintaining the directional beam as the collimated or substantially collimated beam and for increasing a range to which the directional beam is maintained as the collimated or substantially collimated beam, and transmit the phase corrected directional beam to the free space.

In one embodiment, the at least one phase correcting device is an electromagnetic wave transparent phase correcting device.

In one embodiment, the at least one phase correcting device is a straight through phase correcting device that allows the directional beam that is incident on it to travel through in a straight direction without diverting the directional beam into another direction.

In one embodiment, the straight-through phase correcting device is a composite multi-layer structure comprising at least three layers with a central dielectric core sandwiched between at least two dielectric skins on two opposite portions of the dielectric core.

In one embodiment, the central dielectric core is of at least three layers with at least one metamaterial layer sandwiched between two dielectric support layers.

In one embodiment, the at least one metamaterial layer is a metasurface.

In one embodiment, the dielectric skins comprise metasurfaces to simultaneously provide phase shift whilst maintaining an impedance matched structure with minimal loss of power.

In one embodiment, the metasurfaces are incorporated on the dielectric skins.

In one embodiment, thickness of the dielectric skin on each portion of the dielectric core is less than one-tenth of a wavelength in a material that the dielectric skin is made of.

In one embodiment, the dielectric core is made from a low-loss dielectric material.

In one embodiment, thickness of the dielectric core is between one-tenth and one whole wavelength in the dielectric material that the dielectric core is made of.

In one embodiment, the dielectric core has a refractive index between 1 and 3.

In one embodiment, the at least one phase correcting device is a reflective phase correcting device that allows the directional beam to divert to another direction at an angle by reflecting the directional beam that is incident on the reflective phase correcting device into said another direction.

In one embodiment, the angle is between 60 degrees and 120 degrees, preferably, 90 degrees or substantially 90 degrees.

In one embodiment, the reflective phase correcting device is a composite multi-layer structure having at least three layers with a central dielectric core sandwiched between a dielectric skin on a first portion of the dielectric core and a reflective ground plane on a second portion of the dielectric core, the second portion being opposite the first portion.

In one embodiment, the dielectric skin comprises a metasurface to simultaneously provide phase shift to an incoming wavefront and complete reflection with minimal loss of power.

In one embodiment, the metasurface is incorporated on the dielectric skin.

In one embodiment, the system is an earth-based system.

In one embodiment, the system is configured to wirelessly transfer the power up to and beyond 100 meters.

In a fourteenth aspect, the present invention resides in a long-range wireless power transfer method, the method comprising at least the following steps:
  providing a long-range wireless power transfer system comprising a transmitting antenna that is a phased array antenna having an array of antenna elements that are radiating elements and a rectifying antenna that are operatively connected to each other;
  using the transmitting antenna to receive an electric power from a power source as an input, convert the input electric power into electromagnetic energy, and radiate the electromagnetic energy into free space as a directional beam that is a collimated or substantially collimated beam, the collimated or substantially collimated beam being produced by controlling phase and amplitude of each of the antenna elements; and
  using the rectifying antenna to receive the directional beam and convert the electromagnetic energy into electricity.

In a fifteenth aspect, the present invention resides in a long-range wireless power transfer method, the method comprising at least the following steps:
  providing a long-range wireless power transfer system comprising a transmitting antenna and a rectifying antenna that are operatively connected to each other;
  using the transmitting antenna to receive an electric power from a power source as an input, convert the input electric power into electromagnetic energy, and radiate the electromagnetic energy into free space as a directional beam that is a collimated or substantially collimated beam; and
  using the rectifying antenna to receive the directional beam and convert the electromagnetic energy into electricity.

One or more following statements may apply to the invention as defined above in the fourteenth and fifteenth aspects.

In one embodiment, the method further comprises:
  positioning the phase correcting device between the transmitting antenna and the rectifying antenna.

In one embodiment, the method further comprises:
  using the phase correcting device to receive the directional beam radiated from the transmitting antenna, perform phase correcting operation on the directional beam for maintaining the directional beam as the collimated or substantially collimated beam and for increasing a range to which the directional beam is maintained as the collimated or substantially collimated beam, and transmit the phase corrected directional beam to the free space to be received by the rectifying antenna.

In one embodiment, the method further comprises positioning the phase correcting device at or near a distance from the transmitting antenna at which the directional beam starts to diverge.

In one embodiment, the system is an earth-based system.

In one embodiment, the system is configured to transfer the power up to and beyond 100 meters.

In one embodiment, the long-range wireless power transfer method is configured to transfer the power up to and beyond 100 meters.

In one embodiment, the system is the one as defined in one or more statements of the twelfth or thirteenth aspect.

Other aspects of the invention may become apparent from the following description which is given by way of example only and with reference to the accompanying drawings.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings and described in the following description are simply exemplary embodiments of the invention. Hence, specific dimensions and other physical characteristics related to the embodiments disclosed herein are not to be considered as limiting.

It is acknowledged that the term "comprise" may, under varying jurisdictions, be attributed with either an exclusive or an inclusive meaning. For the purpose of this specification, and unless otherwise noted, the term 'comprise' shall have an inclusive meaning, allowing for inclusion of not only the listed components or elements, but also other non-specified components or elements. The terms 'comprises' or 'comprised' or 'comprising' have a similar meaning when used in relation to the system or to one or more steps in a method or process.

As used hereinbefore and hereinafter, the term "and/or" means "and" or "or", or both.

As used hereinbefore and hereinafter, "(s)" following a noun means the plural and/or singular forms of the noun.

When used in the claims and unless stated otherwise, the word 'for' is to be interpreted to mean only 'suitable for', and not for example, specifically 'adapted' or 'configured' for the purpose that is stated.

Unless stated otherwise, a phase correction device may be any suitable device for correcting phase to allow directional beam to be collimated or substantially collimated. Some non-limiting examples of phase correction device include phase plate, phase corrector, aberration corrector, waveplate, wave-front corrector, phase correcting relay, collimator or a combination thereof.

Unless stated otherwise, the term 'earth-based' is to be interpreted as being fully based within the planet Earth and/or within its atmosphere and excludes any system and component(s) of the system located outside the stratosphere of the Earth.

Unless stated otherwise, the system that is 'earth-based' is to be interpreted excludes any system and component(s) of such system that are satellite based.

Unless stated otherwise, the term 'free space' does not refer to outer space. Rather it refers to the space that is devoid of physical obstructions that might hinder propagation of a signal or beam. In the context of this patent specification, the term 'physical obstruction' suggests trees, buildings, hills, mountains, and other significant material objects and does not suggest atomic, molecular, or other particulate matter that is/are commonly present in the atmosphere. Neither does the term 'physical obstruction' suggest climatic conditions such as water vapor, rain, snow, sleet, or hail.

It is known that the word 'substantially' can in some instances, be used to broaden the term. It should be stated that, in this specification, use of the word 'substantially' with a term, to define a characterizing feature(s), gets all the benefit (i.e. benefit of any broadening) afforded by the use of the word 'substantially', and also includes within its scope the feature(s) being the term exactly (without broadening). For example, if a feature is described/defined in the present specification as being 'substantially collimated' then that includes, within its scope, the feature being 'close' to collimated (in so far the word 'substantially' is deemed to broaden the term 'substantially'), and also includes within its scope the feature being 'exactly' collimated.

BRIEF DESCRIPTION OF THE DRAWINGS

Preferred embodiments of the invention will be described by way of example only and with reference to the drawings, in which:

FIGS. 7-12 relate to the schematic diagram of FIG. 6.

FIG. 7: show a normalised shunt susceptance b1 versus phase delay through the device of FIG. 6 for various phase factors.

FIG. 8: show a normalised shunt susceptance b2 versus phase delay through the device of FIG. 6 for various phase factors.

FIG. 9: show behaviour of b1 and b2 versus phase delay through the device of FIG. 6 for dielectric thickness equivalent to 90 degrees.

FIG. 11: shows a typical behaviour of a patch and aperture-type FSS layers (metasurfaces) as a function of frequency.

FIG. 12: is a schematic diagram showing an application of the phase correcting device of FIG. 6.

FIG. 15: shows the computed magnitude of the electric field strength along the range axis for a square antenna of width D, operating at a single wavelength, $\lambda$.

FIG. 16A: shows a phase distribution of electric field across transverse axis at 20.8 m range in an unfocussed case.

FIG. 16B: shows an amplitude of electric field across transverse axis at 20.8 m range in an unfocussed case.

FIG. 17: is a schematic diagram showing an antenna with a spherical phase distribution applied across the aperture plane.

FIG. 18A: shows a phase plot at a range $R'_{max}=17.2$ m for a focused case.

FIG. 18B: shows an amplitude plot at a range $R'_{max}=17.2$ m for a focused case.

FIGS. 19A and 19B: show phase distribution of electric field across aperture plane.

FIGS. 20A and 20B: are contour plots showing spatial distribution of the electric field strength in the unfocused and focused cases.

DETAILED DESCRIPTION OF PREFERRED EMBODIMENTS

Transferring power wirelessly using electromagnetic waves (such as, but not limited to, microwaves) over a long distance in an efficient manner can be difficult. This is mainly because the electromagnetic waves or beams can easily diverge to other directions during transmission of energy. This means the energy received at the receiving end may not be sufficient to provide power.

Therefore, is desirable to have a system and method for efficient transfer electrical power over a reasonably long-distance with a very minimal waste or loss of energy during transmission. It is also desirable to have a system and method for efficient transfer of electrical power that is not too complex and cost efficient to implement and maintain.

The present invention relates to a long-range wireless power transfer system and method for facilitating long-range wireless power transfer using a beam waveguide. The range of wireless power transfer system may be up to and beyond 100 meters. The present invention uses gain-enhanced radiating elements and meta-surfaces to facilitate down-range impedance-matched, collimated or substantially collimated electromagnetic beams for efficient wireless power transfer. The present invention may also use phase correcting device(s) such as straight through phase correcting device(s) and/or reflective phase correcting devices for extending the useful range of a collimated or substantially collimated electromagnetic beam.

Figure 1:
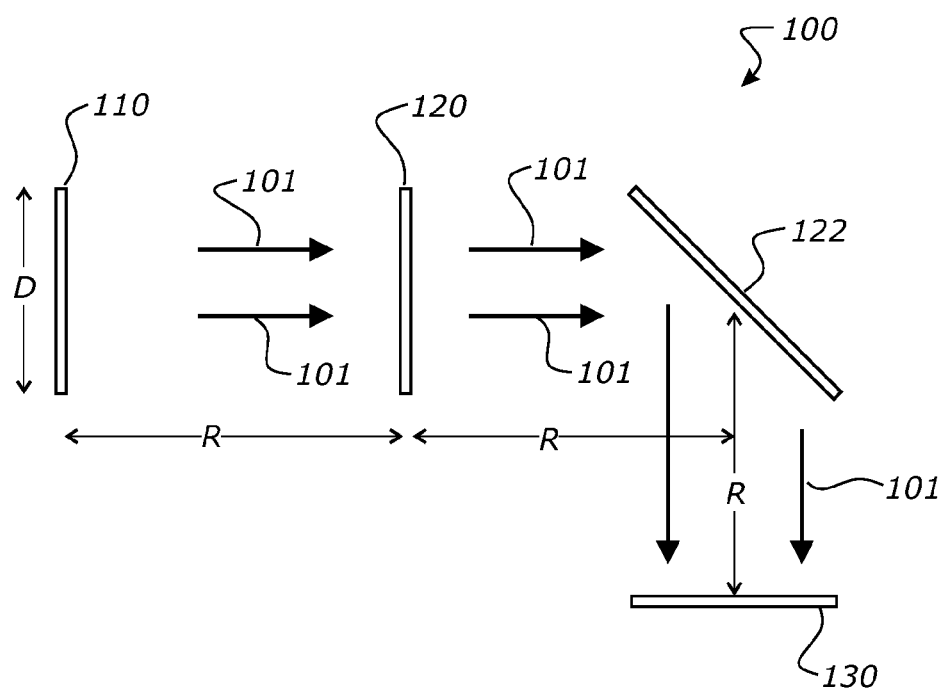
FIG. 1: is schematic diagram of a preferred example of a long-range wireless power transfer system according to the present invention.

With reference to FIG. 1, there is shown an example of a long-range wireless power transfer system 100 of the present invention. As shown, the system 100 comprises a transmitting antenna 110, at least one phase correcting device 120, 122 and a rectifying antenna 130.

The transmitting antenna 110 is configured to receive an electric power from a power source (AC source) as an input, convert the input electric power into electromagnetic energy (for example microwave energy) and radiate the electromagnetic energy into free space as a directional beam. For example, a transmitting antenna 110 may comprise a receiver or transceiver for receiving an electric power from a power source as an input and a convertor for converting the input electric power into electromagnetic energy to enable the transmitting antenna 110 to radiate/transmit the electromagnetic energy into free space as a directional beam 102. In FIG. 1, arrows 101 show direction of the directional beam 102. Directional beam 102 may comprise a plurality of rays.

In FIG. 1, two phase correcting devices 120, 122 are shown. Phase correcting device 120 is a straight through phase correcting device and phase correcting device 122 is a reflective phase correcting device and these will be described later in this specification in more detail. Any number of phase correcting devices may be used as desired or as necessary. For example, the system 100 may only use straight through phase correcting device 120. Alternatively, the system 100 may only use reflective phase correcting device 122. Similarly, the system 100 may use more than one straight through phase correcting device 120 and/or more than one reflective phase correcting device 122.

Figure 4:
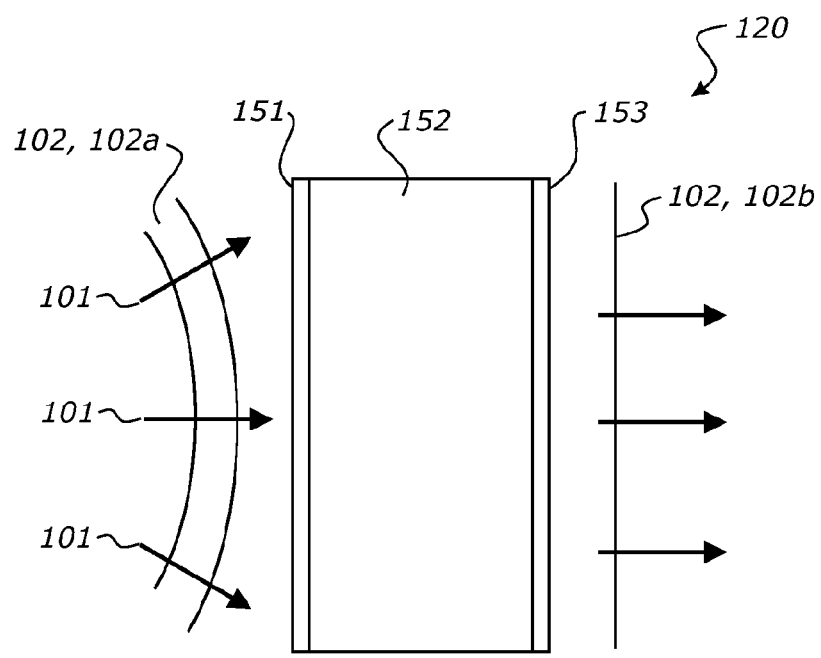
FIG. 4: is a schematic diagram showing a structure of a straight-through phase correcting device according to an embodiment of the present invention. Also, shown is the flow direction of directional electromagnetic beam when the straight-through phase correcting device in used as part of the system of FIG. 1.
Figure 5:
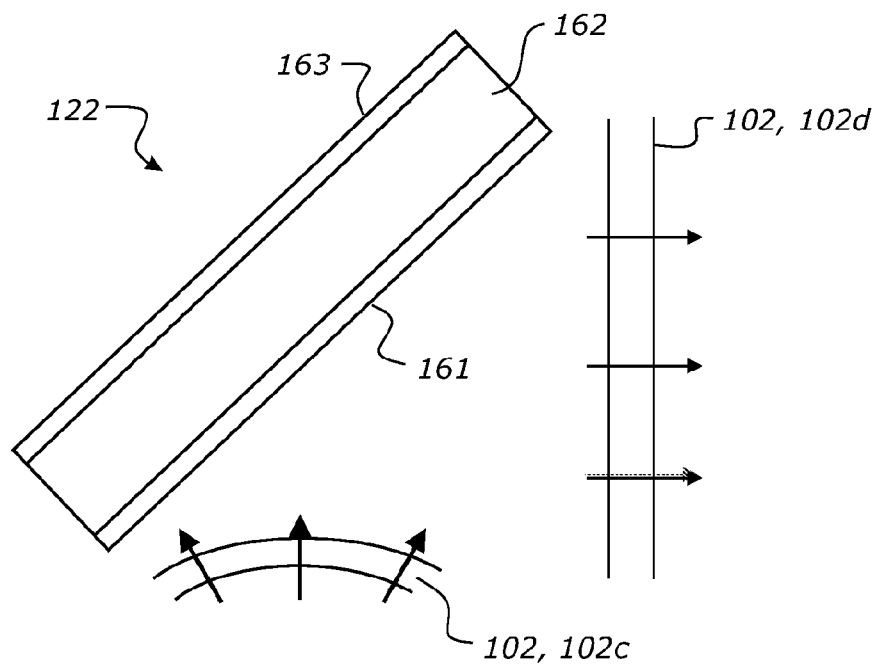
FIG. 5: is a schematic diagram showing a structure of a reflective phase correcting device according to an embodiment of the present invention. Also, shown is the flow direction of directional electromagnetic beam when the reflective phase correcting device in used as part of the system of FIG. 1.

As illustrated in FIGS. 1, 4 and 5, the phase correcting devices 120, 122 are configured to receive the directional beam 102 radiated from the transmitting antenna 122 in the direction shown by arrows 101. Upon receiving the directional beam 102, the phase correction devices 120, 122 are configured to perform phase correcting operation on the directional beam. Such phase correction operation allows the phase correcting devices 120, 122 to maintain the directional beam as a collimated or substantially collimated beam. Also, by correcting the phase of the directional beam using phase correcting devices 120, 122, range to which the directional beam 102 is maintained as collimated or substantially collimated beam can be increased. This is described later in more detail. After performing any desired phase correcting operation, the phase correcting devices 122, 124 will then transmit the phase corrected directional beam to free space.

The rectifying antenna 130 (which is a rectenna) is configured to receive directional beam from the phase correcting device (in this example from phase correcting device 122) and convert the electromagnetic energy into electricity (DC electricity). For example, the rectifying antenna 130 may comprise a receiver for receiving the directional beam from the phase correcting device 122 as an input and a convertor for converting the input electric power into electromagnetic energy.

As shown in FIG. 1, the phase correcting devices 120, 122 and rectifying antenna 130 are positioned at different distances from the transmitting antenna with the phase correcting structure devices 120, 122 positioned between/intermediate the transmitting antenna 110 and the rectifying antenna 130. In FIG. 1, each of the three distances as shown as R, but each of those three distances need not be the same.

It can be appreciated that the directional beam transmitted from the transmitting antenna 110 can maintain the collimation or substantial collimation up to a particular range after which the directional beam will start to diverge resulting in a loss of energy transfer. Such loss of energy is not desirable for efficient power transfer. Therefore, by having at least one phase correcting device 120, 122 at a suitable distance (preferably, at or near the distance at which the directional beam starts to diverge), collimation or substantial collimation of the directional beam can be maintained/restored. Consequently, the range to which the directional beam 102 is maintained as collimated or substantially collimated can be increased thereby allowing the system 100 to provide efficient wireless transfer of the power over a long distance.

The system 100 is most preferably earth-based and this is advantageous as none of the components of the system 100 need to be based in satellite or in outer space.

The transmitting antenna 110, the phase correcting devices 122, 124 and the rectifying antenna 130 according to the embodiments of the present invention will now be described in more detail.

Transmitting Antenna

As mentioned above, the transmission antenna 110 is configured to convert input electric power into electromagnetic energy (e.g. microwave energy) that is then radiated into free space to produce a collimated (preferably highly, i.e., substantially collimated), directional beam 102.

Figure 2:
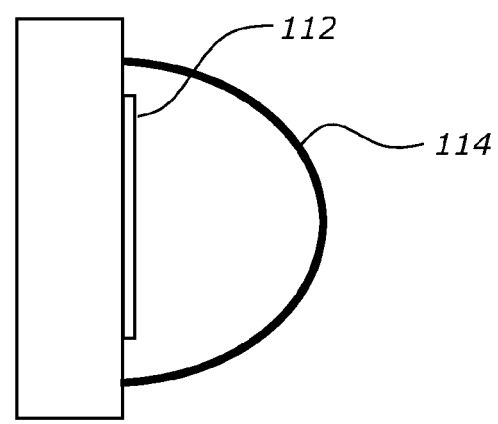
FIG. 2: shows a configuration for gain enhancement of a transmitting antenna using a radome element.

The transmitting antenna 110 may be a phased array antenna having an array of antenna elements that are radiating elements and the collimated or substantially collimated beam may be produced by controlling the phase and amplitude of each of the antenna elements. FIG. 2 shows a single antenna element 112 of an array of antenna elements of the transmitting antenna 110. Each of the antenna element 112 may have an electronically controlled phase shifter to facilitate electronic beam steering, i.e. to facilitate steering of the directional beam 102.

Each of the antenna element 112 may be a patch antenna element and each antenna element 112 may be made from metallic segments etched into a substrate. In other words, each radiating element may consist of a patch antenna configuration made from metallic segments etched onto a substrate.

As shown in FIG. 2, the antenna element 112 may comprise a radome element 114 which can be a low loss dielectric element. The radome element 114 may be hemispherical, substantially hemispherical or similar dome shaped element to allow for antenna gain enhancement. The radome element 114 may be a thin-walled radome element. Preferably, the wall thickness of the radome element is no more than one quarter of a wavelength thick in the material that the radome wall is made of. The wavelength of electromagnetic waves in the radome wall material, denoted $\lambda_d$ is given by the formula:

$$\lambda_d = \frac{\lambda}{n_d} \quad (1)$$

where in the above, $\lambda$ is the free-space wavelength and $n_d$ is the refractive index of the radome wall material.

As shown the radome element 114 is larger than the antenna element 112 to cover the antenna element 112.

As mentioned above, the transfer of power, wirelessly, is efficient only if the energy is confined to a collimated or substantially collimated directional beam 102, preferably highly or substantially collimated beam. Due to diffraction, collimation or substantial collimation of the directional beam cannot be maintained over an arbitrarily long distance in front of the transmitting antenna 110. For example, for a circular antenna aperture of size, D, radiating at a wavelength $\lambda$, the maximum distance, R, over which a collimated or substantially collimated beam exists is given by:

$$R = \frac{D^2 \epsilon}{4\lambda} \quad (2)$$

In equation (2) above, $\epsilon$ is the aperture efficiency of the electric field distribution extending across the antenna face.

As an example, for an antenna with aperture dimension D=25 m, radiating with a uniform aperture distribution ($\epsilon$=1) at a wavelength of 0.050 m, gives a useful collimated or substantially collimated beam out to a range of about 3,000 m (3 Km).

This range can be extended if each radiating element, i.e. antenna element 112 of the transmitting array, i.e. transmitting antenna 110 can be modified to increase its far-field directivity. This can be achieved by adding structures placed in front of the antenna elements, preferably patch antenna elements. As shown in FIG. 2, one way to implement this is by covering each antenna element 112 with a thin-walled, radome (shell) element 114 of diameter larger (preferably slightly larger) than that of the antenna element 112. The radome element 114 may be a low-loss dielectric element comprising at least a dielectric material.

Such radome element 114 can radiate a scattered wave that can constructively interfere with the main radiation pattern of the transmitting antenna 110, more specifically radiation pattern of each transmitting antenna element, to produce directivity enhancement in the forward direction. This effectively increases the electrical size of the antenna aperture over and above its actual physical size thereby enhancing the collimated or substantially collimated range of the directional beam 102 as per equation (2).

Figure 3A:
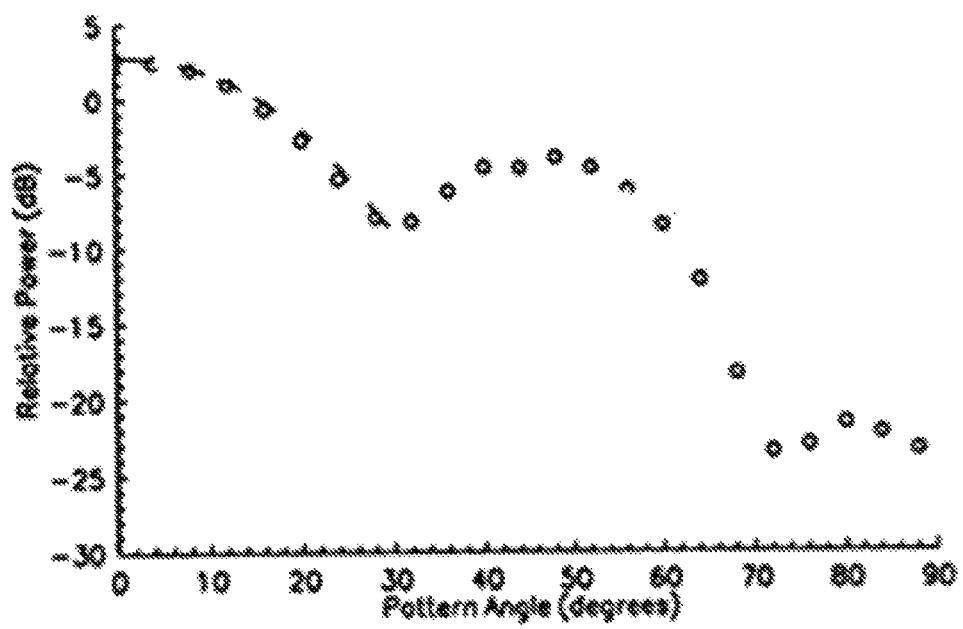
FIG. 3A: shows an example of measured radiation pattern of the transmitting antenna with radome element of FIG. 2 in place.
Figure 3B:
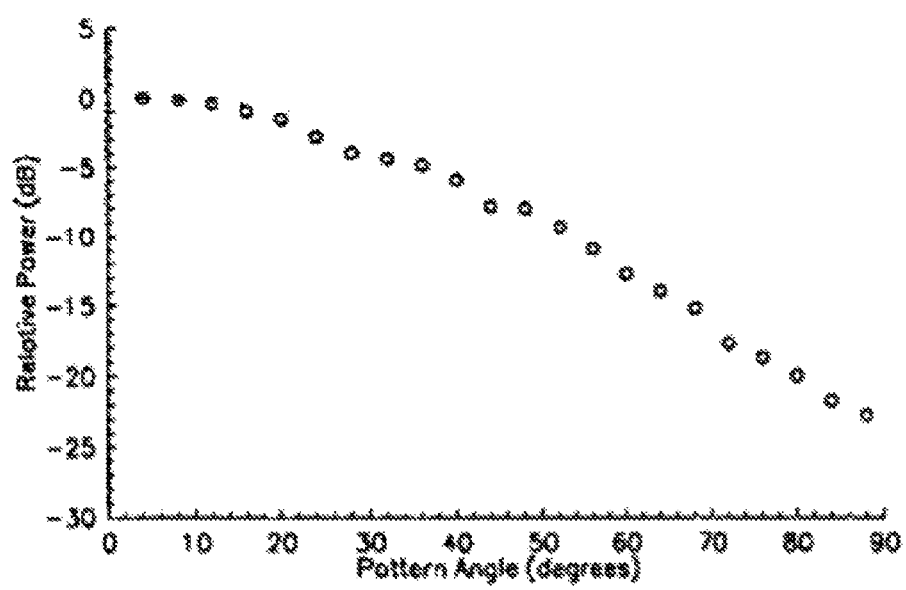
FIG. 3B: shows an example of measured radiation pattern of the transmitting antenna without the radome element of FIG. 2 in place.

FIG. 3a shows an example of measured radiation pattern of the transmitting antenna element 112 with the radome element 114 in place and FIG. 3b shows an example of measured radiation pattern of the transferring antenna 110 without such radome element 114 in place. As shown in FIG. 3a, there is a boresight gain enhancement of +2.5 dB as compared to bare antenna of FIG. 3b that is normalised to 0 db on boresight.

To illustrate this in more detail, the far field gain, G, of any square antenna of dimension D and aperture efficiency $\epsilon$ is given by:

$$G = \frac{4\pi}{\lambda^2} D^2 \epsilon \quad (3)$$

Thus, the distance/range over which useful collimation or substantial collimation of directional beam 102 can be maintained is directly proportional to the far-field gain. Enhancing the gain of individual antenna element 112 therefore enhances the range of the directional beam 102 by the same factor. Hence, it can be appreciated that the use of gain-enhancing structures such as a radome elements 112 over antenna elements 112 increases the range of wireless power transfer.

Phase Correcting Device

In addition or alternative to the use of gain-enhanced radiating elements, i.e. antenna elements 112 and radome element 114 (radome shells which can be a dielectric radome shells) for the transmitting antenna 110 as described above, another method of increasing the range of the collimation or substantial collimation of the directional beam 102 is to use one or more phase correcting structures/phase correcting device(s) 120 in the path of the directional beam 102. As explained above and shown in FIG. 1, system 100 may comprise two phase correcting devices namely the straight through phase correcting device 120 and the reflective phase correcting device 122. Also, as mentioned above any number of phase correcting devices may be used as desired or as necessary. In certain embodiments, only one phase correcting device 120 or 122 may be used.

In one example, the system 100 according to the present invention may comprise enhanced radiating elements, i.e. antenna elements 112 and radome element 114 (radome shells which can be a dielectric radome shells) for the transmitting antenna 110 as described above, but no phase correcting device.

The straight-through phase correcting device 120 is for allowing the directional beam that is incident on it to travel though the device 120 in a straight direction without diverting the directional beam into another direction. The straight through phase correcting device 120 can transmit a high proportion of power incident on and modify the phase of the wavefront of the directional beam 102 in a desired fashion.

On the other hand, the reflective phase correcting device 122, is for allowing the directional beam 102 to divert to another direction at an angle by reflecting the directional beam 102 that is incident on the reflective phase correcting device into another direction. The reflective phase correcting device 122 can reflect all of the power incident on its surface but modify the phase of the wavefront of the directional beam 102 in a desired fashion, for the purpose of directing the incident wave/incident directional beam at an angle, preferably, but not exclusively, 90 degrees as shown schematically in FIG. 1. The angle may be any angle between 60 degrees and 120 degrees.

As shown in FIG. 1, the straight-through phase correcting device 120 is preferably placed down or configured to be placed down at a distance R from the transmitting antenna 110. Preferably, the distance R is measured from aperture of the transmitting antenna 110. The straight-through phase correcting device 120 is designed to perform phase correcting operation on the directional beam 102 (wavefront on the directional beam 102) emanating from the transmitting antenna 110.

The straight-through phase correcting device 120 may introduce a phase delay distribution across extent of the directional beam 102 incident on it such that any diverging beam behaviour caused by a non-planar incident wavefront of the directional beam 102 is corrected, as in a manner of a lens. The emerging wavefront of the directional beam 102 from the straight-through phase correcting device 120 will then be similar to that produced at the aperture plane of the transmitting antenna 110 and will therefore largely reproduce the propagation characteristics of the transmitting antenna 110 over the range from zero to R, for a similar distance in front of the straight-through phase correcting device 120 or the plane of the straight-through phase correcting device 120. It can therefore be appreciated that this will extend the useful range over which a collimation or substantial collimation of the directional beam 102 is maintained. Multiple straight-through phase correcting devices may be cascaded to further increase the useful range of the collimated or substantially collimated beam.

It may also be important to design a phase correcting device so that the wavefront of the directional beam 102 that is incident on the phase correcting device suffers minimal reflection loss, i.e. the phase correcting device is impedance matched to the directional beam/wave incident on it. This can maximise the amount of power transmitted through such phase correcting device which may be an important aspect in efficient wireless power transfer.

Therefore, one aspect of the present invention resides design of a phase correcting device, such as a straight-through phase correcting device 120 that utilises at least two metasurfaces to simultaneously provide any desired phase shift whilst maintaining an impedance-matched structure with minimal losses.

The straight-through phase correcting device 120 as shown in FIG. 4 is preferably electromagnetically transparent.

The straight-through phase correcting device 120 may be a composite multi-layer structure which in this example is a three-layer structure with a central dielectric core 152 sandwiched between outer layers that are dielectric skins 151, 153 on two opposite portions of the dielectric core 153. The multi-layer-structure can comprise more than three layers. In certain embodiments, the dielectric core can be of at least three layers with at least one metamaterial layer sandwiched between two dielectric support layers. That metamaterial layer may be a metasurface. An example of such an embodiment is described later with reference to FIGS. 6 to 11.

The dielectric skins 151, 153 comprise/incorporate metasurfaces to simultaneously provide phase shift whilst maintaining an impedance matched structure with minimal loss of power. The dielectric skins 151, 153 are preferably thin with the thickness of each skin being no more than one tenth of a wavelength in the dielectric medium of the skins. The dielectric medium of the skins is the dielectric material that the skins are made of.

The dielectric core 152 is preferably made from a low-loss dielectric material such as a foam. The thickness of the dielectric core is preferably between one-tenth and one whole wavelength in the medium of the dielectric core. The medium of the dielectric core is the material that the dielectric core is made of. The dielectric core preferably has a refractive index of between 1 and 3. The thickness and refractive index may vary over the surface of the device 120 to achieve the desired phase shift.

In FIG. 4, the directional beam 102a that is incident on the device 120 is shown as a diverging wavefront and the directional beam 102b that is transmitted from the device 120 is shown as a phase-corrected and collimated or substantially collimated wavefront. Each of the directional beams 102a, 102b may comprise a plurality of rays.

The phase and amplitude of the transmitted and reflected waves from the device 120 may be determined using the standard equivalent transmission line method involving the so-called 'ABCD matrix approach'.

A two-by-two matrix with elements A, B, C & D can be defined for each layer with the overall system matrix found by matrix multiplying all three individual matrices as follows:

$$\begin{bmatrix} A & B \\ C & D \end{bmatrix} = \begin{bmatrix} A_1 & B_1 \\ C_1 & D_1 \end{bmatrix} \begin{bmatrix} A_2 & B_2 \\ C_2 & D_2 \end{bmatrix} \begin{bmatrix} A_1 & B_1 \\ C_1 & D_1 \end{bmatrix} \quad (4)$$

In the above matrices the matrix elements with subscript '1' refer to the metasurfaces which are taken as identical in design for both outer layers that are dielectric skins 151, 153 on two opposite portions of the dielectric core 153. This gives a symmetric structure which is required for impedance matching purposes. The metasurfaces are assumed to have negligible thickness even though they may reside on a fibre-glass or plastic substrate (taken as electrically thin).

Similarly, in the above matrices, the matrix elements with subscript '2' refer to the central dielectric core 152. For the intended application, the directional beam 102 that is incident on the device 120 may impinge on the device 120 at or close to normal incidence. Under these conditions, the matrix elements can be defined in terms of the thickness and refractive index of the various materials as follows:

For the (thin) metasurfaces/dielectric skins 151, 153:

$$A_1 = D_1 = 1$$

$$B_1 = 0$$

$$C_1 = jb$$

where b is the normalised shunt susceptance of the metasurface and $j = \sqrt{-1}$ For the dielectric core 152:

$$A_2 = D_2 = \cos\theta$$

$$B_2 = \frac{j\sin\theta}{n}$$

$$C_2 = jn\sin\theta$$

$$\theta = knd$$

$$k = \frac{2\pi}{\lambda}$$

where $\lambda$ is the free-space wavelength, n the refractive index of the core material and d is its thickness.

Inserting the above expressions for the matrix elements into equation (3) and performing the necessary matrix multiplication gives the following for the system matrix elements:

$$A = D = \cos\theta - \frac{b\sin\theta}{n} \quad (5)$$

$$B = \frac{j\sin\theta}{n}$$

$$C = 2jb\cos\theta + jn\sin\theta - \frac{jb^2\sin\theta}{n}$$

The transmission and reflection coefficients, T and $\Gamma$, respectively, are defined in terms of the ABCD matrix elements as follows:

$$T = \frac{2}{A+B+C+D} \quad (6)$$

$$\Gamma = \frac{(A+B)-(C+D)}{A+B+C+D}$$

Inspection of the expression in equation (6) for the reflection coefficient, $\Gamma$, shows that for the case of a perfectly matched structure, giving a reflection coefficient of zero, requires that both A=D and B=C.

The condition A=D is automatically satisfied due to the symmetry of the structure. Imposing the other condition, B=C, gives the following expression on using the matrix element expressions in equation (5):

$$b^2 - 2bn \cot\theta - n^2 + 1 = 0$$

The two solutions to this quadratic equation are:

$$b = n\cot\theta \pm \sqrt{n^2\cosec^2\theta - 1} \quad (7)$$

Equation (7) is the key expression that specifies the required metasurface properties via the normalised shunt susceptance, b, in terms of the refractive index, n, and electrical thickness, 0, of the central dielectric core 152.

If the transmission coefficient, T, is now evaluated using equation (5) but the conditions for a perfectly matched structure, namely, A=D and B=C, is also imposed the expression is obtained:

$$T_0 = \frac{1}{A+B} = \frac{1}{\left[\cos\theta - \frac{b\sin\theta}{n} + \frac{j\sin\theta}{n}\right]}$$

where, the subscript '0' has been used for the transmission coefficient to indicate that it applies when the reflection coefficient is zero.

Now using the solutions for b given by equation (6) gives the following:

$$\cos\theta - \frac{b\sin\theta}{n} = \mp\sqrt{1 - \frac{\sin^2\theta}{n^2}}$$

which gives:

$$T_0 = \frac{1}{\left[\frac{j\sin\theta}{n} \mp \sqrt{1 - \frac{\sin^2\theta}{n^2}}\right]} = \frac{1}{\left[j\chi \mp \sqrt{1-\chi^2}\right]} \quad (8)$$

where $\chi = \sin\theta/n$

The expression for $T_0$ in equation (8) can be re-written in polar form as a modulus and phase, namely, $T_0 = |T_0|\exp(j\Phi_0)$, where $\Phi_0$ is the phase function (radians) for a matched structure.

From equation (8), evaluating the modulus of $T_0 = |T_0| = \sqrt{\chi^2 + 1 - \chi^2} = 1$. This confirms the expected result for an impedance-matched structure with zero reflection coefficient, that is, 100% transmission (neglecting any dissipative losses). Again, from (8), the phase of $T_0$ is given by:

$$\Phi_0 = \tan^{-1}\left[\frac{\chi}{\mp\sqrt{1-\chi^2}}\right] \quad (9)$$

Using the results of equations (7) and (9), we can find the required normalised shunt susceptance of the metasurface for a matched impedance condition for a given phase shift introduced by the structure of the phase c. The resulting expression is as follows:

$$b = \frac{(\cos\theta \pm \cos\Phi_0)}{\sin\Phi_0} \quad (10)$$

Equations (9) and (10) guide the design procedure for the impedance-matched device 120. For a given phase shift, $\Phi_0$, required at a given position over the surface of the device 120 to phase-correct the incoming wavefront, the core design required (thickness and refractive index) are defined by equation (8) through the parameter $\chi$.

The metasurface properties (determined by b) are then given by the expression in equation (10) for the core design arising from equation (9).

Thus, impedance matching can be obtained for device 120 for any specified phase shift by adjusting the design of the metasurface at each desired location on the surface of the device 120. This optimises power transfer through the device 120 whilst producing a phase-corrected wavefront that extends the useful range of the electromagnetic directional beam 102.

The reflective phase correcting device 122 is used to divert the directional beam, typically, but not exclusively, at right angles to the incident directional beam is similar in form to the straight-through phase correcting device 120 as described above, except that one of the dielectric skins incorporating metasurfaces may be replaced with a metallic ground plane, which is a reflective ground plane. This is shown in FIG. 5 where the central dielectric core 162 is sandwiched between a dielectric skin 161 incorporating a metasurface on one portion (front face) of the central core 163 and a metallic ground plane 163 on the opposite portion (rear face) of the dielectric core 163. Such arrangement ensures complete reflection of the directional beam 102 that is incident on the reflective phase correcting device 122. Incident radiation/directional beam impinging on the single metasurface layer (i.e. dielectric skin 162 incorporating a metasurface) of the device 122 can have its phase front modified by the metasurface. Such design allows for re-collimated or substantially re-collimated reflected directional beam. In FIG. 5, the diverging wavefront of the directional beam 102 that is incident on the device 122 is denoted by reference numeral 102c and the directional beam 102 that is transmitted from the device 122 is denoted by reference numeral 102c. As shown, the directional beam 102c is a diverging beam and the directional beam 102b is a phase corrected and collimated or substantially collimated beam.

Another embodiment of the phase correcting device according to the present invention that is in the form of an impedance matched multi-layer structure or metalens will now be described with reference to FIGS. 6 to 11. The phase correcting device described with reference to FIGS. 6 to 11 may be used in addition to or in alternative to the phase correcting devices 120 and 122 in the system 100 as described above.

Figure 6:
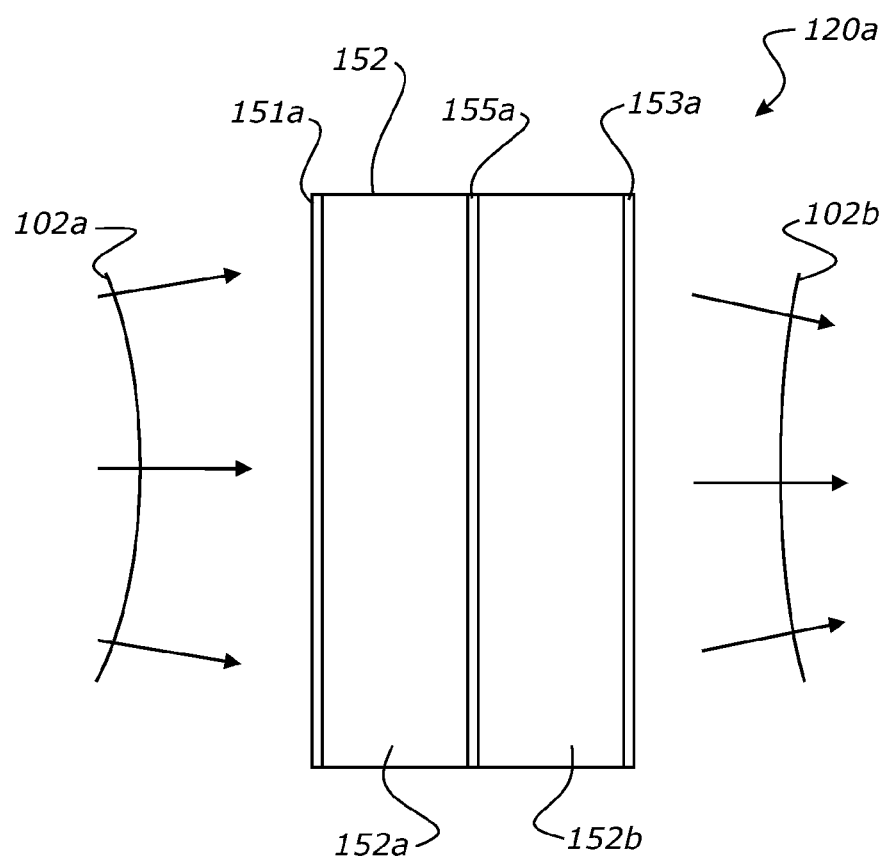
FIG. 6: is a schematic diagram showing a preferred example of a phase correcting device according to the present invention.

The phase correcting device according 120a of FIG. 6 is a passive planar structure incorporating multiple metasurface layers within a composite sandwich configuration. The metasurfaces in this case are arrays of metallic patches or apertures in a metallic screen, typically etched from a thin metal-clad substrate. The electromagnetic properties of the metallic metasurfaces are controlled by the size, shape and periodicity of the array elements.

With the use of phase correcting device 120a (i.e. metalens), a means of imparting given phase advance or phase delay onto an incident plane wave impinging on the structure at, or near, normal incidence, whilst eliminating any reflected wave from the front surface of the structure can be provided. This latter property is equivalent to matching the input wave impedance of the structure to that of a free space.

In certain embodiments, the present invention resides in the construction of a planar lens (metalens) for focusing or steering a beam of incident electromagnetic radiation whilst maximising the electromagnetic wave energy that is transmitted through the lens. The impedance-matched property of the lens structure, plus the use of low-loss dielectric materials such as low-density foams, and thin-dielectric polymer substrates, ensures that energy lost through surface reflections and dissipation is minimised, One aspect of the lens design is to select suitable electromagnetic properties for the metasurfaces such that a prescribed phase advance or delay can be achieved whilst simultaneously eliminating reflections.

One other advantageous aspect of this design is that a constant overall panel thickness can be used. This is achieved by using three metasurface layers, each separated from each other by a fixed thickness of low-density dielectric foam, i.e. by dielectric support layer 152a and dielectric support layer 152b. There are sufficient degrees of freedom in the design process to allow a constant panel thickness to be used for all desired phase shifts whilst simultaneously achieving an impedance match. This greatly simplifies the design and manufacture of the lens (metalens) structure.

Focusing or beam deflection properties are achieved by constructing a large planar sandwich structure divided into a number of discrete zones, each zone having its own prescribed phase shift. Each zoned panel has a particular metasurface design to achieve the necessary phase properties.

For each phase zone, one metasurface may be centrally located in the multi-layer sandwich, whilst the other two metasurfaces may be placed on the outermost surfaces of the sandwich. The outer layers may have identical properties, whilst the central metasurface may have different properties, in general. This results in a sandwich structure that has mirror symmetry about its central plane.

The choice of metasurface properties can also be important. There is a mathematical relationship between the properties of the outer metasurfaces or metasurface layers 151a, 153a and central metasurface or metasurface layer 155a that may need to be satisfied to achieve a given phase shift whilst maintaining an impedance-matched surface. Thus, the metasurface properties are not independent of each other for the phase correcting device 120a to work in the desired way.

As mentioned above, the phase correcting device 120a in FIG. 6 is in the form of an impedance-matched planar metalens structure using three metasurfaces 151a, 153a and 155a and two dielectric cores 152a, 152b. Therefore, the phase correcting device may also be referred to as metalens or lens. In FIG. 2, the dielectric core 152 comprises at least two dielectric layers (i.e. dielectric support layers) 152a and 152b and at least one metasurface layer 155a sandwiched between the dielectric support layers 152a, 152b.

The design shown in FIG. 6 can impart a prescribed phase shift to an incoming wavefront of directional beam i.e., 102a for which the incident ray directions impinge on the lens at, or close to, normal incidence, whilst simultaneously maintaining an impedance match to free-space, thereby minimising the amplitude of any reflected wavefront, i.e., directional beam 102b. In FIG. 6, the directional beam 102b may be collimated or substantially collimated beam.

The key elements in achieving these properties are the three metasurfaces 151a, 153a, 155a incorporated into the outermost and central planes of the overall structure of the phase correcting device 120a. This is intended to be utilised as the key component of a planar lens of fixed thickness in which the properties of the metasurfaces are locally altered to provide a given phase shift for a particular portion of an incoming wavefront, i.e. directional beam 102a, whilst minimising reflections from the metalens (phase correcting device 102a) and maintaining a constant physical thickness—with no need to alter the dielectric properties of any of the layers.

The metasurfaces 151a, 153a, 155a may themselves can be considered as having negligible thickness and typically consist of arrays of printed metallic elements or apertures in a conducting plane, that are etched from a thin metal-clad dielectric substrate in the manner similar to that used in the manufacture of a printed circuit board.

Figure 7:
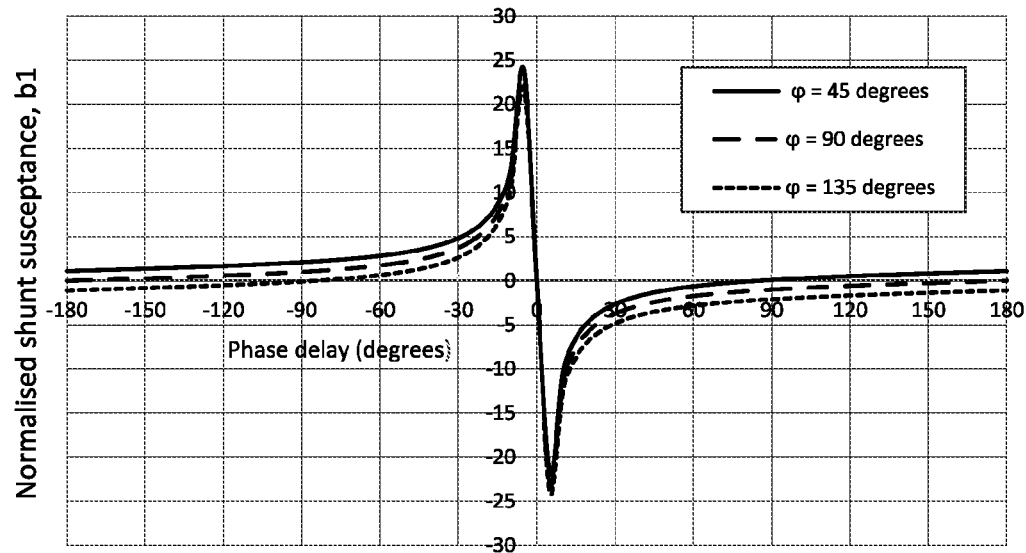

In order to produce an impedance-match for an incoming plane wave, i.e. directional beam 102a (that is, to eliminate a reflected wave, i.e. directional beam 102b and maximise transmission of energy through the structure), one of the necessary requirements is to have a structure that is symmetric about its centre line. In FIG. 7, this is achieved by having identical thicknesses of dielectric support layers of thickness, d, and refractive index, n. Furthermore, sandwiched between these dielectric layers is the central metasurface 155a. Finally, to further achieve the required symmetry, the outermost metasurfaces 151a, 153a is identical in design but will in general have different properties to the central metasurface 155a.

In designing the lens to produce a prescribed phase delay/advance over a given portion of the lens surface whilst maintaining an impedance-matched condition, the properties of the two metasurface designs are adjusted accordingly for a given dielectric layer thickness and refractive index.

Mathematical analysis of the metalens, i.e. phase correcting device 120a of FIG. 6 will now be described.

To ascertain the required metasurface properties, the multi-layer structure of FIG. 6 is analysed using the well-established cascaded 'ABCD' matrix method as follows:

$$\begin{bmatrix} A & B \\ C & D \end{bmatrix} = \begin{bmatrix} 1 & 0 \\ jb_1 & 1 \end{bmatrix} \begin{bmatrix} \cos\phi & j\frac{\sin\phi}{n} \\ jn\sin\phi & \cos\phi \end{bmatrix} \begin{bmatrix} 1 & 0 \\ jb_2 & 1 \end{bmatrix} \begin{bmatrix} \cos\phi & j\frac{\sin\phi}{n} \\ jn\sin\phi & \cos\phi \end{bmatrix} \begin{bmatrix} 1 & 0 \\ jb_1 & 1 \end{bmatrix} \quad (11)$$

In equation (11), each 2×2 matrix on the right-hand side represents the properties of the five individual layers in the structure in terms of an equivalent transmission line.

The outermost metasurfaces 151a, 153a are denoted by a normalised shunt susceptance $b_1$, where the normalisation factor is the admittance of free-space (=1/376.73 $\Omega^{-1}$).

Similarly, for the central metasurface 155a, the normalised shunt susceptance is denoted by $b_2$.

In equation (11), we also have $j=\sqrt{-1}$.

The dielectric support layers 152a, 152b are represented by the remaining matrix $$\begin{bmatrix} \cos\phi & j\frac{\sin\phi}{n} \\ jn\sin\phi & \cos\phi \end{bmatrix},$$

which appears twice in the cascade. The thickness, d, and refractive index, n, are the same for each dielectric support layer 152a, 152b. The propagation phase is denoted by $$\phi = \frac{2\pi n d}{\lambda_0}$$

where $\lambda_0$ is the tree-space wavelength.

This set of matrix elements in equation (11) corresponds to the case of a normally incident plane-wave which is assumed to adequately represent the incident electromagnetic field. This will be sufficient for the large-aperture lenses envisaged that are illuminated from a source that is at a distance much larger than the lens diameter. Under this small incidence-angle assumption, the properties of the lens will be almost independent of the plane of incidence and incident wave's polarisation.

The left-hand side of equation (11) is the resultant 2×2 matrix arising from the matrix product of all five layers and has matrix elements, A, B, C & D. The transmission and reflection coefficients of the multi-layer structure, denoted by T and Γ, respectively, are then found from the following formulae:

$$T = \frac{2}{A+B+C+D} \quad (12)$$

$$\Gamma = \frac{(A+B)-(C+D)}{A+B+C+D} \quad (13)$$

On performing the matrix multiplications in equation (11), the matrix elements are as follows:

$$A = D = \frac{b_1+b_2}{2n^2} + \left[1 - \frac{b_1 b_2}{2n^2}\right]\cos 2\phi - \left[b_1 + \frac{b_2}{2}\right]\left(\frac{\sin 2\phi}{n}\right) \quad (14)$$

$$B = j\left[-\left(\frac{b_2}{2n^2}\right) + \left(\frac{b_2}{2n^2}\right)\cos 2\phi + \left(\frac{\sin 2\phi}{n}\right)\right] \quad (15)$$

$$C = j\left[\left(\frac{b_2}{2}\right)\left(1 + \left(\frac{b_1^2}{n^2}\right)\right) + \left(2b_1 + \left(\frac{b_2}{2}\right)\left(1 - \left(\frac{b_1^2}{n^2}\right)\right)\right)\cos 2\phi + (n^2 - b_1(b_1+b_2))\left(\frac{\sin 2\phi}{n}\right)\right] \quad (16)$$

In equation (14), the matrix elements A and D are purely real quantities and are numerically equal to each other which follows from the symmetry of the multi-layer structure about the central plane.

Equations (15) and (16) show that the matrix elements B and C are purely imaginary quantities, which also results from the symmetry of the structure.

Inspection of equation (13) for the reflection coefficient of the multi-layer structure indicates that for an impedance-matched condition (Γ=0) it is required that:

A+B=C+D

Since by equation (14) A=D is automatically satisfied, the condition for an impedance match in equation (16) reduces to the requirement that B=C. Thus, using the expressions in (15) and (16) gives the following equation for an impedance match:

$$\left(\frac{b_2}{2}\right)\left(1 + \left(\frac{b_1^2}{n^2}\right) + \left(\frac{1}{n^2}\right)\right) + \left(2b_1 + \left(\frac{b_2}{2}\right)\left(1 - \left(\frac{b_1^2}{n^2}\right) - \left(\frac{1}{n^2}\right)\right)\right)\cos 2\phi + (n^2 - 1 - b_1(b_1+b_2))\left(\frac{\sin 2\phi}{n}\right) = 0 \quad (18)$$

For the impedance-matched condition of equation (17), the transmission coefficient defined by equation (12) reduces to the following form given that A=D and B=C:

$$T_{matched} = \frac{1}{A+B} \quad (19)$$

In equation (19), the impedance matched condition means that the magnitude of the transmission coefficient, $T_{matched}$, will be unity, barring any dissipative losses. If low-loss materials are used for the dielectric layers in the multi-layer structure of the phase correcting device 120a, then these dissipative loss can be assumed negligible and the refractive index, n, taken as a purely real number. Therefore, equation (19) represents a pure phase shift imparted on the incident wavefront.

Inspection of equations (14) and (15) shows that A is purely real and B purely imaginary. Therefore, equation (19) can be written in the following form:

$$T_{matched} = \frac{1}{\alpha + j\beta} = \frac{\exp\left(-j\tan^{-1}\left(\frac{\beta}{\alpha}\right)\right)}{\sqrt{\alpha^2 + \beta^2}} \quad (20)$$

Where in equation (20), $\alpha=A$ and $\beta=-jB$

From equation (20), it is clear that the phase delay, $\theta$, (in radians) is given by:

$$\theta = \tan^{-1}\left(\frac{\beta}{\alpha}\right) \quad (21)$$

Re-arranging equation (21) gives:

$$\alpha = \beta \cot\theta \quad (22)$$

Equation (20) can now be re-written using the results of equations (21) and (22) to give:

$$T_{matched} = \frac{1}{\alpha + j\beta} = \frac{\exp(-j\theta)}{\beta\sqrt{1+\cot^2\theta}} = \frac{\exp(-j\theta)\sin\theta}{\beta} \quad (23)$$

Since the magnitude of $T_{matched}$ is unity (for the assumed lossless media) under impedance-matched conditions, equation (23) requires that:

$$\alpha = \sin\theta \quad (24)$$

Using equation (15) in equation (24) to express $\beta$ then gives an expression for the normalised shunt susceptance of the central metasurface, $b_2$, for a given phase delay, $\theta$, and electrical thickness for the dielectric layers, $\phi$, viz:

$$b_2 = 2n\cot\phi - n^2\sin\theta\csc^2\phi \quad (25)$$

An expression for the normalised shunt susceptance of the outermost metasurfaces, $b_1$, can be found by using the expression for $\alpha$ in equation (22) and equating this to the expression for A given by equation (14), viz:

$$A = \alpha = \beta\cot\theta = \frac{b_1 b_2}{2n^2} + \left[1 - \frac{b_1 b_2}{2n^2}\right]\cos2\phi - \left[b_1 + \frac{b_2}{2}\right]\left(\frac{\sin2\phi}{n}\right) \quad (26)$$

Using equation (24) to express $\beta$, and equation (25) for $b_2$, gives, after some algebraic manipulation:

$$b_1 = n\cot\phi - \cot\left(\frac{\theta}{2}\right) \quad (27)$$

Equations (25) and (27) are the key expressions that guide the design of the metalens. For a given phase delay, $\theta$, dielectric phase factor, $\phi$, and refractive index, n, the required values of normalised shunt susceptance for the metasurfaces giving an impedance-matched structure ($b_1$ and $b_2$) are readily found from equations (25) and (27).

Metasurface Design and Realisation

Figure 8:
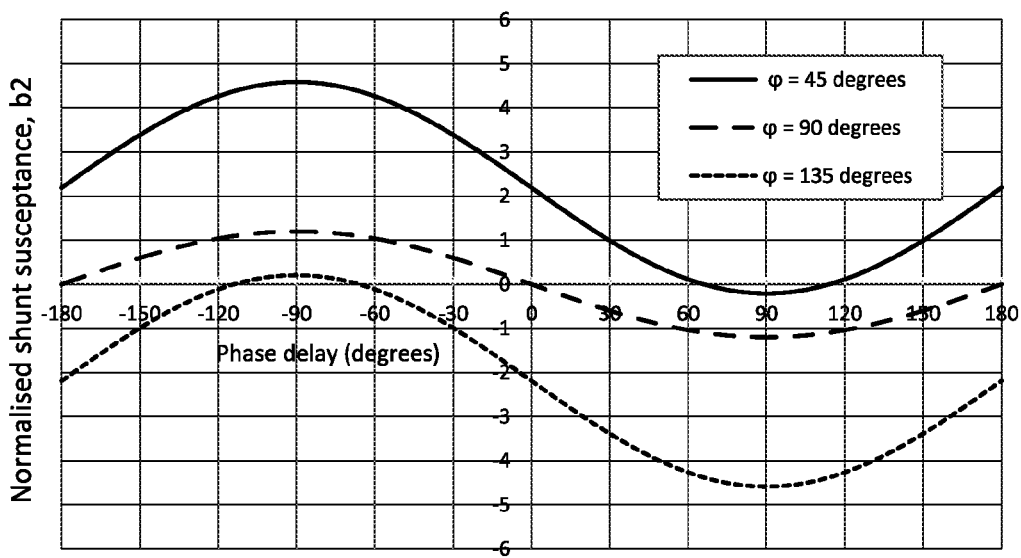

Graphs/plots of $b_1$ and $b_2$ are shown in FIGS. 7 and 8, respectively, as a function of phase delay through the lens structure for various values of the electrical thickness of the dielectric layer, $\phi$. In the graphs shown in FIGS. 7 and 8, the refractive index of the dielectric has been set to 1.095 which is typical of the low-density, low-loss foam material envisaged in a physical embodiment of the lens. Such a material has a dielectric constant of 1.2, the square root of which gives the refractive index of 1.095.

There are some important observations concerning the graphs shown in FIGS. 7 and 8:

The phase delay is permitted to have negative as well as positive values, that is, spanning the full range −180 to +180 degrees. A negative phase delay is equivalent to a positive phase advance.

For negative values of the normalised shunt susceptance, a metasurface has inductive properties that are realised in practice by a periodic array of apertures in a thin, electrically conducting sheet.

For positive values of the normalised shunt susceptance, a metasurface has capacitive properties that are realised in practice by an array of electrically conducting patches that are insulated from each other.

A metasurface is resonant when the normalised shunt susceptance is either zero or +/− infinity. Zero susceptance corresponds to a perfectly transparent metasurface, whilst an infinite value corresponds to a perfectly reflecting one. For an impedance-matched lens with, ideally, no reflection for an incoming wave, it is clear that reflection resonances (infinite susceptance values) are to be avoided.

Transmission resonances (zero susceptance) do not present an issue fundamentally in realising a practical embodiment of the matched lens. However, the transverse dimensions of resonant elements are typically between one-quarter and one half-wavelength in size and also exhibit maximum dissipative losses at the resonant frequency. It is preferable, therefore, to use smaller, non-resonant elements in the lens design.

Inspection of FIGS. 7 and 8 for the values of $b_1$ and $b_2$ shows that for positive phase delays (right-hand half of the horizontal axis in the plots), $b_1$ is mostly negative (inductive) but can pass through zero (a transmission resonance) and become positive (capacitive) for certain combinations of dielectric thickness and phase delay. The same observation can be made concerning $b_2$.

For values of $b_1$ and $b_2$ that correspond to negative phase delays (shown on the left-hand half of the horizontal axis in FIGS. 7 and 8), $b_1$ is almost always positive (capacitive) but can pass through zero (a transmission resonance) and become negative (inductive) for a few combinations of dielectric thickness and phase delay. The same observation can also be made concerning $b_2$.

For ease of lens design, i.e. phase correcting device 120a design, negative phase delays (phase advances) are preferable since a wide range of phase values can be accomplished using only non-resonant, capacitive metasurface elements, that is, periodic arrays of conducting patches that can be made small, with an array periodicity that is also small compared to the wavelength. This latter condition makes the properties of the metasurface less dependent on the plane and angle of incidence, albeit that this assumed to be small in this analysis.

Figure 9:
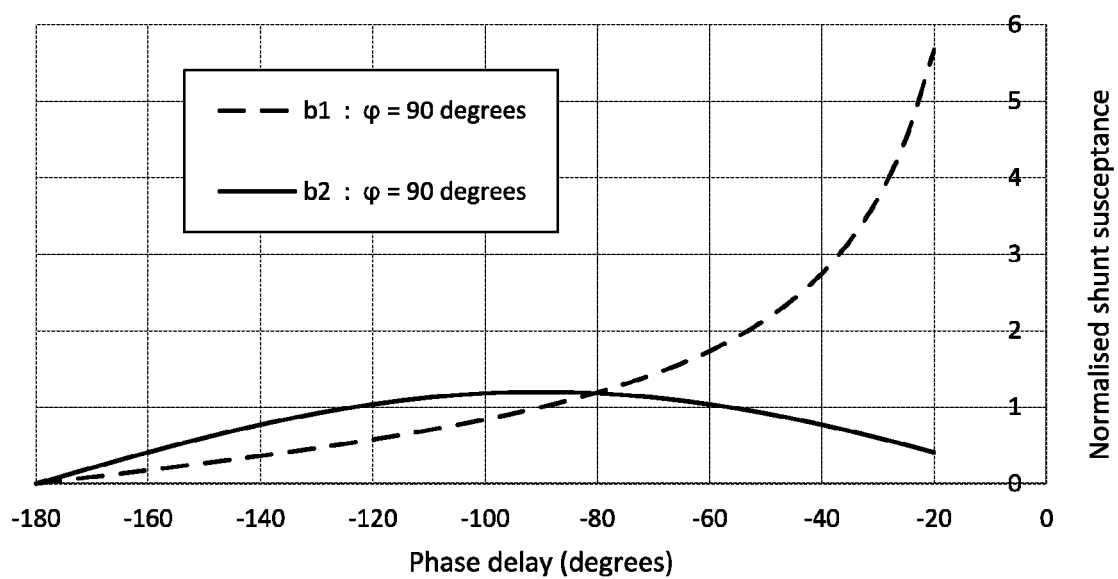

A particular example of shunt susceptance values that remain capacitive for both $b_1$ and $b_2$ over a wide range of phase advances is shown in FIG. 9 for the case when the dielectric layers have an electrical thickness $$\phi = \frac{\pi}{2}$$

(90 degrees). This thickness corresponds to one quarter of a wavelength in the dielectric medium, which in this example is chosen to have a dielectric constant of 1.2, that is, a refractive index of 1.095.

FIG. 9 shows a behaviour of b1 and b2 versus phase delay through lens (phase correcting device 120*a*) for dielectric thickness equivalent to 90 degrees. The refractive index is 1.095. For the particular case shown in FIG. 9, the equations (25) and (27) for the shunt susceptance become somewhat simplified, viz:

$$b_2(\phi = \pi/2) = -n^2 \sin\theta \quad (28)$$

$$b_1(\phi = \pi/2) = -\cot\left(\frac{\theta}{2}\right) \quad (29)$$

Note that the phase delay θ is negative in FIG. 9 corresponding to a phase advance, thereby giving positive shunt susceptance values in the above equations (28) and (29). Phase advance values from 20 to 180 degrees can be readily achieved using the design approach illustrated in FIG. 9 for quarter-wavelength dielectric layers.

Figure 10A:
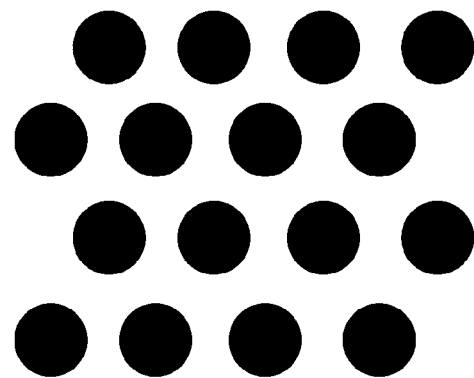
FIG. 10A: shows an example of an array of circular patches on a rhombic lattice.
Figure 10B:
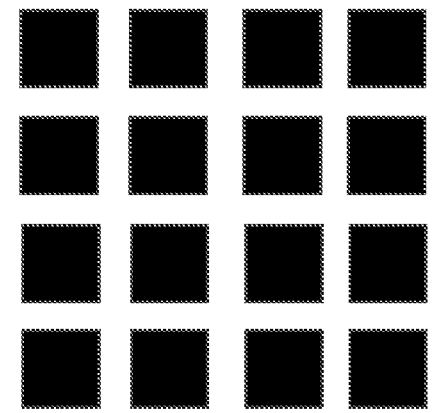
FIG. 10B: shows an example of an array of square patches on a square lattice.
Figure 10C:
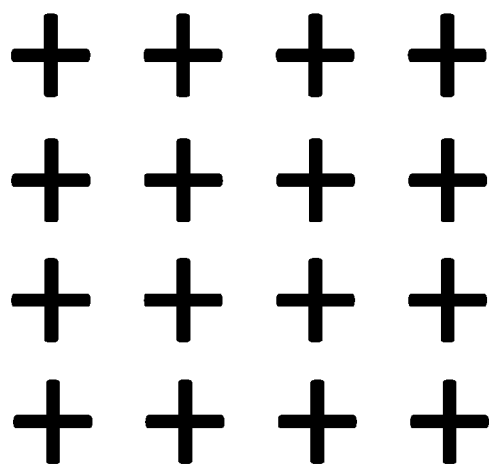
FIG. 10C: shows an example of an array of crosses on a square lattice.

Physical realisation of the required normalised shunt susceptance values for a given phase advance can be achieved using the known properties of periodic arrays of metallic patches, often referred to as Frequency Selective Surfaces (FSS), which are a form of metasurface. Some typical array element designs and lattices are shown in FIGS. 10A, 10B and 10C. FIG. 10A shows an example of an array of circular patches on a rhombic lattice. FIG. 10B is an example of an array of square patches on a square lattice. FIG. 10C is an example of an array of crosses on a square lattice.

In FIGS. 10A, 10B and 10C, the shaded areas denote the metallic region of the surface. For frequencies below resonance, this type of metasurface produce a positive shunt susceptance, namely one that is capacitive. These metasurfaces can be readily manufactured using conventional etching techniques applied to thin, metal-clad dielectric substrates, or by inkjet printing techniques using highly conducting inks.

Although may not be useful for the lens design of the present invention, negative shunt susceptance values, giving inductive metasurfaces, can be produced in a similar fashion. The main difference between this type of metasurface and its capacitive counterpart is that the shaded areas shown in FIGS. 10A, 10B and 10C represent the aperture regions etched from a continuous metallic plane.

Figure 11:
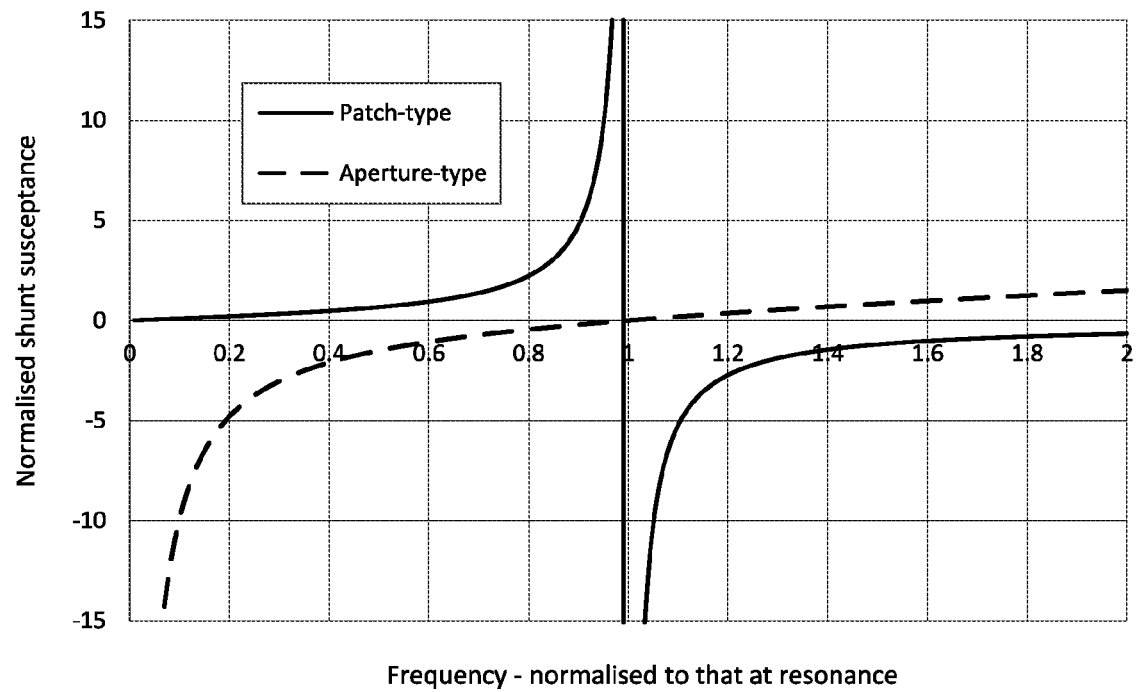

FIG. 11 shows a typical behaviour of patch and aperture-type Frequency Selective Surface (FSS) layers (metasurfaces) as a function of frequency. FIG. 11 shows a typical normalised shunt susceptance behaviour for patch and aperture-type metasurfaces versus normalised frequency. Resonance occurs a normalised frequency of 1. The desired shunt susceptance value at a given frequency is obtained by adjusting the size of the patch/aperture element along with the periodicity and type of array lattice.

It is usual to assume that there are a large number of array elements in a given metasurface design so that a detailed electromagnetic analysis of the array properties can be approached by assuming an infinite periodic array. This allows the analysis to be carried out on just a single unit cell in the lattice in conjunction with a periodic boundary condition that invokes Floquet's Theorem for such periodic structures.

Computational electromagnetic techniques such as the Method of Moments (MoM), Finite Elements (FE) and the Finite Difference Time Domain (FDTD) method are all well-established and exist as commercially available software packages that enable the design and analysis of the above-mentioned metasurfaces to be readily implemented.

Regarding the macro-structure of the metalens itself, one approach is to divide the aperture of the lens into a number of zones over which different phase advances are realised to produce the desired outgoing wavefront (converging, diverging, collimated or substantially collimated, for example).

The array periodicity and lattice type can be made the same over the entire lens surface (that is, over all zones) but each zone tile would contain a sub-array of elements whose size was chosen to achieve a the required shunt susceptance value for the desired phase advance over that particular zone.

Alternatively, one could implement a smooth, gradual transition of element sizes over the entire lens surface, still keeping the periodicity and lattice type the same over the entire aperture. This however would be more difficult to design and more challenging to manufacture.

One application of the phase correcting device 120*a* that is in the form of an impedance matched multi-layer structure or metalens as described above will now be described with reference to FIG. 12.

The range over which power can be transferred by the transmitted electromagnetic energy beam, whilst remaining collimated or substantially collimated, is dictated by the antenna aperture size and the wavelength of operation. In particular, the usable range is proportional to the area of the transmitting antenna and inversely proportional to the wavelength. A planar, phased array antenna is envisaged as the radiating structure for the transmitter or transmitting antenna which facilitates control over the phase and amplitude of the array elements as a means of providing control over the emerging beam's wavefront.

With the antenna aperture size determined in the above manner, long-range performance can result in a large number of expensive phased array components. However, one way to de-couple the need for a large exit aperture (to achieve the desired range) and the high cost of phased array components is to use a passive, phase-correcting metalens to achieve the large exit aperture.

The lens can then be illuminated by a separate phased array antenna placed behind the lens. This antenna has smaller aperture dimensions than the exit aperture of the metalens and therefore requires fewer components, thereby reducing the cost of the transmitting antenna. This is akin to a parabolic reflector dish being illuminated by a much smaller feed antenna near its focal point.

The metalens concept differs from this in that the lens is transparent to incoming electromagnetic waves except for imparting a phase shift across the wavefront. It has the same physical thickness across its entire aperture, is highly transparent. The particular metalens structure envisaged is impedance matched to incoming electromagnetic waves, and provides the required phase advance or phase delay across the exit aperture to produce the desired, phase-corrected transmitted wavefront. The emerging wavefront could be a plane-wave, converging or diverging wavefront as required.

The required phase shift will vary over the surface of the lens and this can be realised by using different metasurface properties at different locations across the lens aperture. The three-layer metalens design methodology described previously allows the various phase shifts to be realised in practice in the form of tiles that are assembled to form the complete metalens structure.

The amplitude and phase of each phased-array transmitting antenna element is adjusted to provide the desired illumination field onto the metalens. Having electronic control of the phase-array antenna elements permits modifications and real-time corrections to be made to the illuminating field.

Figure 12:
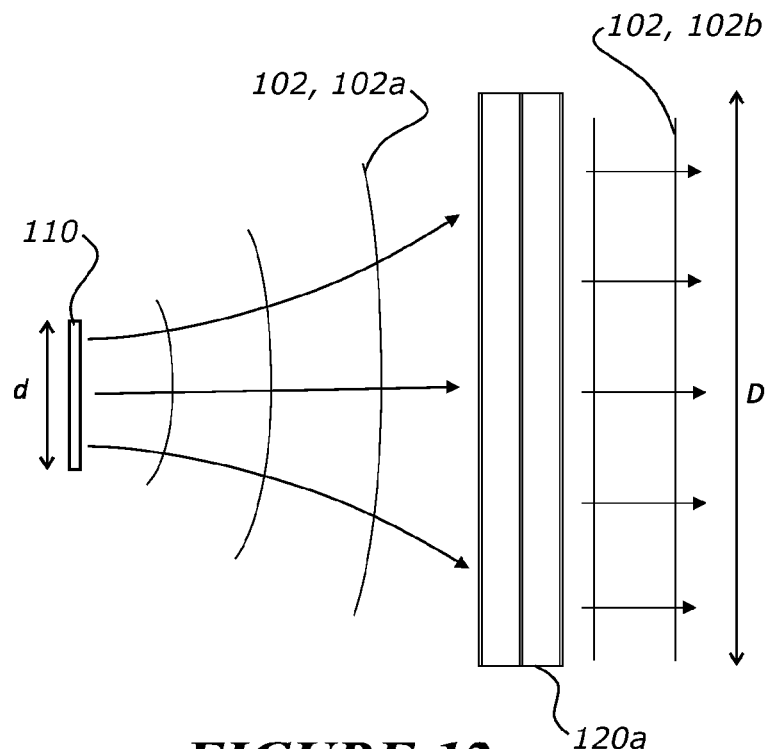

Reverting now to FIG. 12 which is a schematic of the concept of metalens 120a as described above, a planar, three-layer metalens 120a may be used to phase-correct the illuminating field to produce the desired output wavefront over a larger aperture than that of the transmitting antenna 110. Shown in FIG. 12 is the case of an emerging plane-wave. Converging wavefronts (which produce focusing) can be realised by reconfiguring the metalens properties to give the required phase distribution across its exit aperture.

In FIG. 12, directional beam 102, 102a relates to illuminating wavefront emitted by the transmitting antenna of aperture size d and direction beam 102, 102 relate to emerging, phase corrected wavefront. Exit aperture size D is also shown.

The self-same configuration described above with reference to FIG. 12 for the transmitting portion of a long-range wireless power transfer system can be equally applied to the receiving part or rectifying antenna 130, with the direction of energy flow reversed.

For the receiver or rectifying antenna 130, the metalens (i.e. phase correcting device 120a) now focuses the incoming electromagnetic wave from the transmitting antenna 110 onto a rectifying antenna 130 placed behind the metalens. The size of the rectifying antenna 130 can therefore be reduced in the same way as that of the transmitting antenna 110, thereby saving on component costs and weight.

Rectifying Antenna (Rectenna)

Rectifying antenna 130 of the long-range wireless power transfer system 100 is the terminating structure for receives the directional beam 102 delivered by the rest of the system and converts the incident electromagnetic energy back into electricity. In other words, the rectifying antenna is configured to receive the directional beam from the phase correcting device(s) 120, 122 and convert the electromagnetic energy into electricity. This rectifying antenna can be referred to as 'rectenna'.

The rectifying antenna 130 may be of a similar size as the aperture of transmitting antenna 110. The rectifying antenna 130 may consist an array of antenna elements that may in turn be electrically connected to solid-state rectifying components such as Schottky diodes. Such rectifying components and their associated circuitry can rectify the incoming electromagnetic energy to produce a direct current (DC) output which is then delivered to the required load.

For efficient electromagnetic-to-DC conversion, the antenna elements (patched elements) of the rectifying antenna may incorporate an impedance-matching layer at the interface with free-space. Such impedance-matching layer may incorporate a metasurface. The metasurface may be designed and tuned to eliminate any reflected waves from the front surface of the rectenna, thus maximising energy transfer to the rectifying elements.

Figure 13:
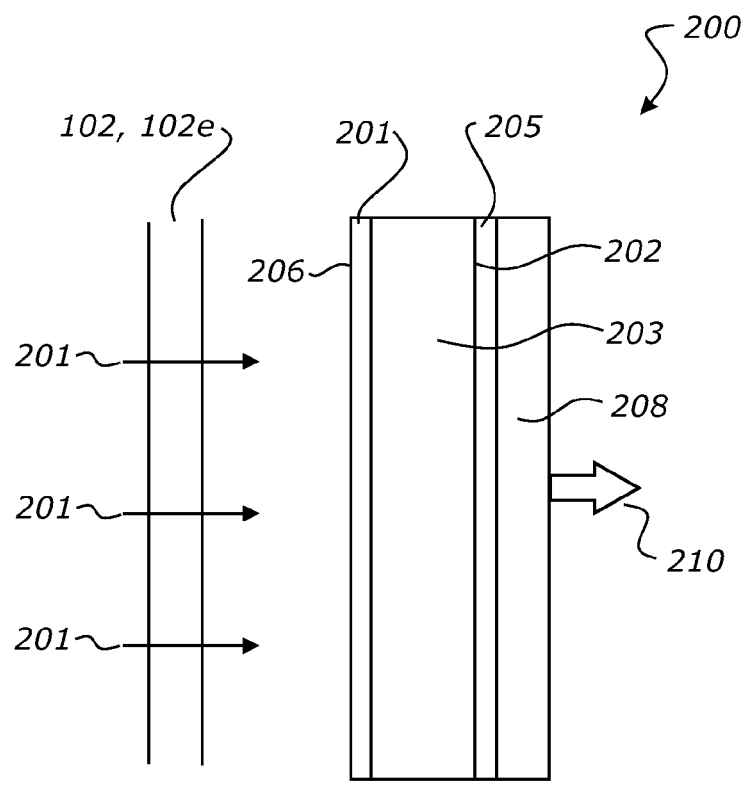
FIG. 13: is a schematic diagram showing a schematic diagram of rectifying antenna structure according to an embodiment of the present invention. Also, shown is the flow direction of directional electromagnetic beam when the of rectifying antenna structure is used as part of the system of FIG. 1.

FIG. 13 is a schematic diagram showing the rectifying antenna concept using front-mounted metasurface for impedance matching. This rectifying antenna concept described with reference to FIG. 13 may be applied to the rectenna 130 as described above.

As shown in FIG. 13, the rectifying antenna structure 200 may comprise a central core 203. The central core 203 is preferably made from a low-loss dielectric material such as a foam. The thickness of the central core 203 is preferably between one-tenth and one whole wavelength in the dielectric material of the core. The central core 203 preferably has a refractive index of between 1 and 3. The thickness and refractive index may vary over the surface of the rectifying antenna to achieve the desired impedance match.

The central core 203 may comprise a first portion 201 which is the front face and a second portion 202 which is the rear face opposite the first portion 201. The first portion 201 may comprise dielectric skin 206. The dielectric skin 206 may comprise/incorporate a metasurface for impedance matching to directional beam 102e (incident wavefront/electromagnetic energy) that is incident on the rectifying antenna structure 200. The dielectric skin 202 is preferably thin with the thickness of the skin being no more than one-tenth of a wavelength in the dielectric medium of the skin. The dielectric medium of the skin is the dielectric material that the skin is made of.

Rectifying antenna array 205 (receiving antenna array) may be positioned at the second portion 202 of the central core 203. Rectifying circuit 208 (solid-state rectifying components such as Schottky diodes) may be electrically connected to the rectifying antenna array 205 to produce DC output 210 which is then delivered to the required load.

The rectifying antenna array 205 may comprise plurality of antenna elements electrically connected rectifying circuits (solid-state rectifying components such as Schottky diodes) to produce DC output which is then delivered to the required load.

Such rectifying antenna structure 200 as described above comprising impedance matching layer incorporating metasurface allows for efficient electromagnetic-to-DC conversion. The metasurface may be designed and tuned to eliminate any reflected waves from the front surface of the rectenna, thus maximising energy transfer to the rectifying elements.

Similar to transmitting antenna as described above, the rectifying antenna array 205 may optionally comprise plurality of antenna elements whereby each antenna element is covered by an electrically small radome shell designed to increase the antenna gain of each receiving antenna element compared to the case with no radome shells present. In other words, each antenna element may comprise a radome element which may be a low-loss dielectric element. The radome element may be hemispherical, substantially hemispherical or similar dome shaped element to allow for gain enhancement of the rectifying antenna array 205. The radome element may be a thin-walled radome element. Preferably, the wall thickness of the radome element is no more than one quarter of a wavelength thick in the material that the radome wall is made of. The wavelength of electromagnetic waves in the radome wall material, denoted $\lambda_d$ is given by the formula:

$$\lambda_d = \frac{\lambda}{n_d} \tag{30}$$

where in the above, $\lambda$ is the free-space wavelength and $n_d$ is the refractive index of the radome wall material.

The radome element may be larger than the antenna element of the rectifying antenna array 205 to cover the antenna element of the rectifying antenna array.

Focusing in the radiating near-field region as a means to increase the range of wireless power transfer using electromagnetic beams.

In the present invention, the transmitting antenna 110 may operate in the radiating near field region within which the electromagnetic field is substantially confined to a collimated or substantially collimated beam. This is ideally suited to directional power transfer to a receiving antenna or rectenna 130 of similar size.

Described herein is a method to increase the range over which an electromagnetic beam can be propagated with minimal beam divergence by the use of focusing. The primary use for this invention is for efficient long-range wireless power transfer using electromagnetic radiation or beam such as a microwave beam.

The key principle of the system proposed herein is to operate the transmitting antenna in the radiating near-field region rather than the far-field radiation zone. The latter is characterized by a diverging beam with an angular distribution that remains unchanged with distance and an inverse square-law for the power density as a function of range.

By contrast, the radiating near-field region (which occurs nearer to the antenna aperture than the distance at which far-field conditions commence) maintains a beam extent that is mostly confined to a cylinder of comparable size to the antenna aperture. This beam displays only modest beam divergence with power density levels comparable to those in the antenna aperture plane. There is no inverse square-law decay of the power density in the radiating near-field. This makes it highly attractive for long-range wireless power transfer purposes. By placing a similarly sized receiving antenna at the maximum range over which radiating near-field conditions are maintained, results in highly efficient power transfer with little beam loss.

The range over which the radiating near-field extends is proportional to the aperture area of the transmitting antenna and inversely proportional to the wavelength. Thus, for a given range of operation, at a specified wavelength, the antenna size must be chosen large enough to achieve the required radiating near-field conditions. To this end, any means by which the useable range of such a system can be increased without increasing the size of the antennas is an advantage.

The present invention may achieve this range extension by applying a spherical phase distribution across the aperture plane of the transmitting antenna so as to achieve a degree of beam focusing in the radiating near-field.

This creates a converging wavefront emanating from the transmitting antenna which partially offsets the natural beam divergence caused by diffraction. This results in a narrowing of the beam waist as one moves away from the antenna. The beam waist eventually attains a minimum size, at which the phase front is almost planar, before diverging again as one moves to increasing distance. At a particular range, this diverging wavefront expands such that the amplitude distribution of the electromagnetic field mimics that in the antenna aperture plane, with a phase front that is the conjugate of the spherical distribution originally imparted on the aperture field. This 'image' of the aperture field essentially reproduces the antenna plane distribution at this distance from the antenna (barring a phase conjugation). The distance from the antenna aperture at which this image occurs is greater than that without focusing, which is the means by which an increased range for the system described is achieved.

Figure 14:
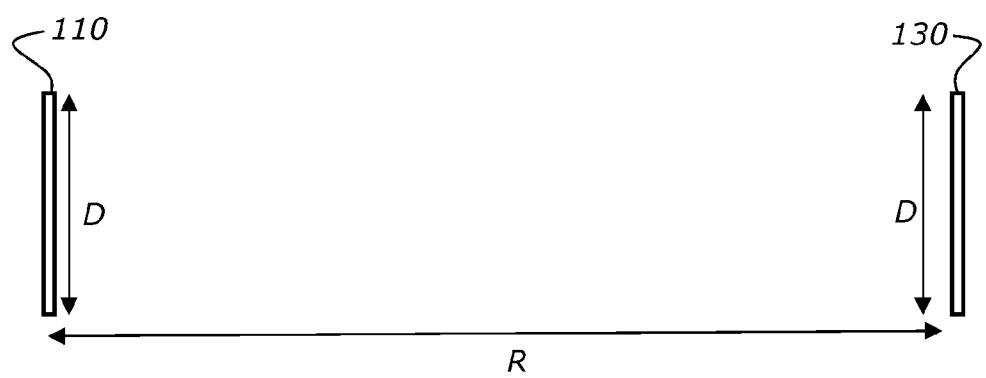
FIG. 14: is a schematic diagram showing a schematic representation of a phase array transmitting antenna used to transmit electromagnetic energy in the form of a collimated beam or a substantially collimated beam with little angular divergence to a rectifying antenna.

FIG. 14 shows a schematic representation of a phase array transmitting antenna used to transmit electromagnetic energy in the form of a collimated beam or a substantially collimated beam with little angular divergence to a receiving/rectifying antenna 130 (rectenna) as described above. In FIG. 14, the transmitting antenna 110 and the receiving or rectifying antenna 130 are operating in the radiating near-field. The transmitting antenna 110 is a planar phased-array transmitting antenna with electronically controllable electric field amplitude and phase distributions across aperture and the rectifying antenna may be planar receiving antenna. The transmitting antenna 110 and the rectifying antenna 130 may be the ones as described above. The beam divergence is minimal if the distance R between the transmitting antenna 110 and the receiving antenna is limited to within the radiating near field region. Range R is given by the following formula:

$$\text{Range} = R \le R_{max} = \frac{A_{\mathit{eff}}}{\pi\lambda} \tag{31}$$

where in the above, $A_{\mathit{eff}} = A\epsilon$ is the effective area of the transmitting antenna aperture having a physical aperture area, A, and $\epsilon$ is the aperture efficiency (dictated by the amplitude taper across antenna) and $\lambda$ is the free space wavelength.

Figure 15:
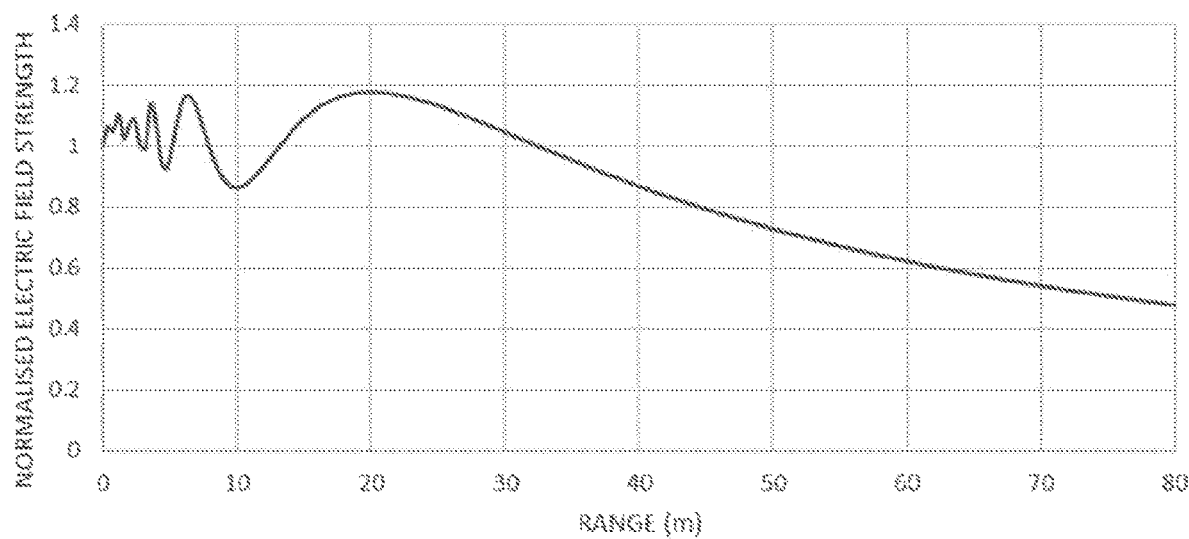
FIGS. 15, 16A, 16B, 17, 18A, 18B, 19A, 19B, 20A and 20B relate to the schematic diagram of FIG. 14.

FIG. 15 shows the computed magnitude of the electric field strength along the range axis for a square antenna of width D, operating at a single wavelength, $\lambda$. The range, R, spans the radiating near-field region for which R has yet to reach the Fraunhofer limit describing the onset of the far-field region ($>2D^2/\lambda$). The field strength is normalized with respect to the maximum value in the aperture plane. FIG. 15 is shows normalised axial electric field strength versus range where aperture efficiency=0.85; D=1.92 m and frequency=5.8 GHz.

In the example of FIG. 15, the frequency used is 5.8 GHz and the antenna is made up of an array of patch antenna elements with pitch 30 mm. The antenna width is 1.92 m, giving a square array of 64×64 patches. A Gaussian amplitude taper is applied across both principal axes in the antenna aperture plane (range=0) such that the field at the antenna edges is a factor 1/e down on the maximum level in the aperture. This amplitude tapering creates a smoother near-field beam distribution than that from a uniform aperture field, with lower sidelobes. In the example of FIG. 15, all elements are excited in-phase—that is, there is no focusing applied.

As the plot of electric field in FIG. 15 shows, in the radiating near-field region, the on-axis field strength does not decay with increasing range, R, according to a reciprocal law (corresponding to an inverse square-law for the power) as it does in the radiating far-field, but oscillates about the aperture-plane intensity before smoothly decaying.

In the radiating near-field region, the maximum on-axis field strength exceeds that in the antenna aperture due to constructive interference, and occurs at a range, $R_{max}$. For the case of the antenna array elements being excited in-phase, the value of $R_{max}$ is given by the formula:

$$R_{max} = \frac{A_{\mathit{eff}}}{\pi\lambda} \tag{32}$$

where, $\lambda$ is the wavelength of radiation and $A_{\mathit{eff}}$ is the effective area of the transmitting antenna aperture. The effective area is defined as the physical area multiplied by the aperture efficiency. In the example shown in FIG. 15, the aperture efficiency is 0.85 for the Gaussian taper used. The resulting value for $R_{max}$ is 20.8 m.

Figure 16A:
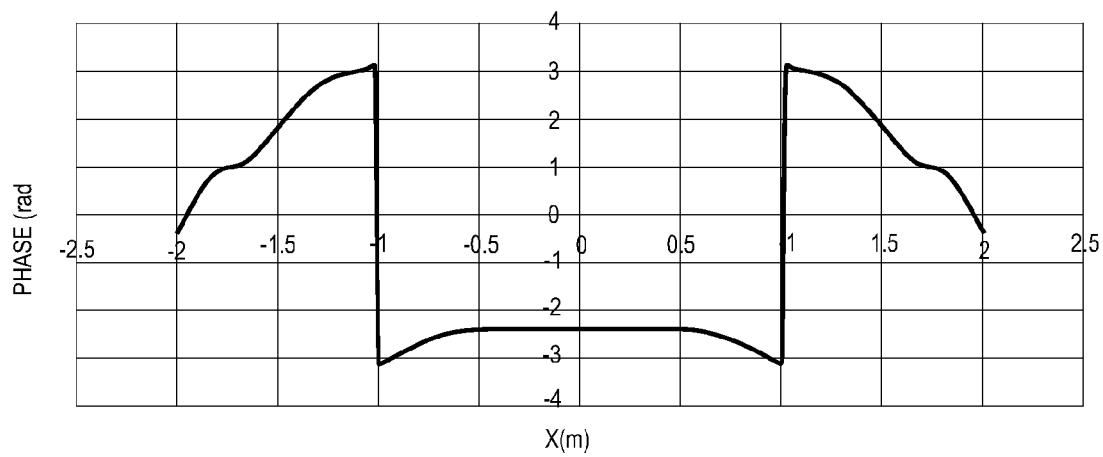
Figure 16B:
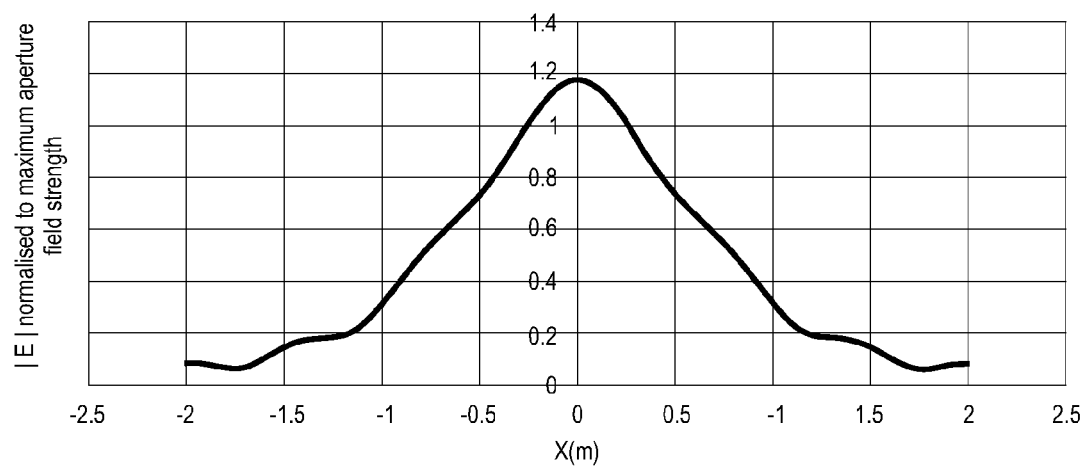

The characteristic of the phase front across the beam at this range (where the maximum field strength occurs) is substantially that of a plane wave over most of the antenna aperture width. This phase distribution is illustrated in FIG. 16A. FIG. 16A shows phase distribution of electric field across transverse axis at range=$R_{max}$=20.8 m and unfocussed case. The corresponding electric field amplitude is shown in FIG. 16B. FIG. 16B shows amplitude of electric field across transverse axis (normalised to maximum aperture field strength), unfocussed case and range=$R_{max}$=20.8 m FIGS. 16A and 16B show that for ranges up to $R_{max}$, there is minor beam divergence, which favours efficient radiated power transfer to the rectifying antenna 130. The important characteristics of the radiating near-field approach for power transfer are, therefore, the direct proportionality of the useful range with the aperture area of the transmitting antenna 110, and the reciprocal dependence on the wavelength.

At first glance, $R_{max}$ may appear to be the maximum range over which the electromagnetic beam (such as microwave beam) may be transferred to the rectifying antenna 130 without losing substantial amounts of power due to the diverging beam characteristics introduced by diffraction. However, the useful range for power transfer can be extended by exploiting one other characteristic of the radiating near-field region, namely, the possibility of focusing the transmitted beam. This can be achieved with a phased array antenna by applying a suitable (and programmable) phase distribution across the radiating elements.

Figure 17:
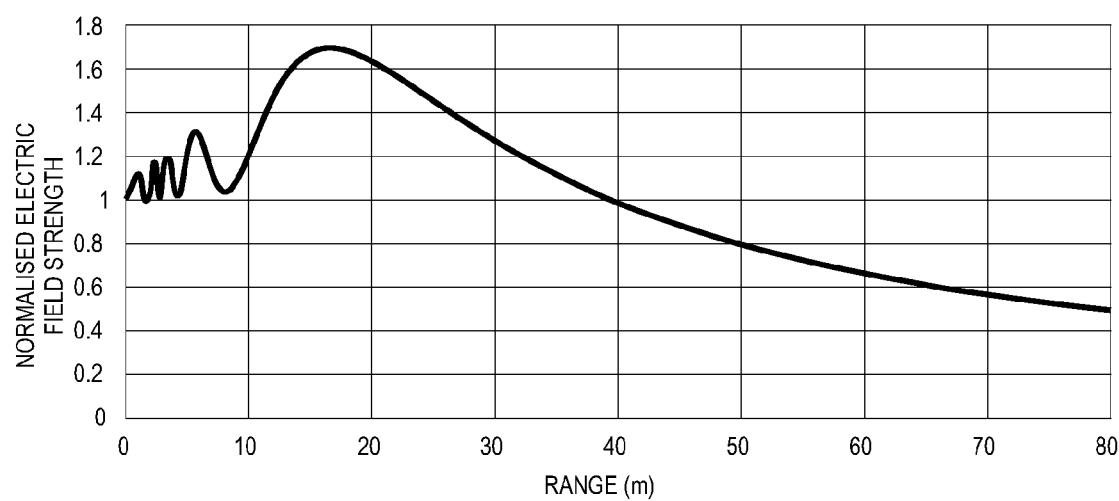

FIG. 17 shows the axial field distribution for the same antenna as described above but with a spherical phase distribution applied across the aperture plane. This phase distribution may be determined by placing a point on the range axis a distance, f, from the antenna aperture (the focal length) and then adding a phase correction to each of the transmitting antenna's array elements such that radiation from all elements arrives in phase at point, f. FIG. 17 shows normalised axial electric field strength versus range-focussed case with f=50 m; aperture efficiency=0.85; D=1.92 m and frequency=5.8 GHz.

It is important to note that when applying this type of focusing to the antenna aperture elements, the maximum field strength along the range axis does not occur at the focal point, f, but moves to a location closer to the antenna aperture than in the unfocused case. In the above example, the focal point is set to a range of 50 m and the maximum field strength is then located at a range =$R'_{max}$=17.2 m. The maximum field strength is increased in amplitude with focusing as FIG. 17 indicates.

Figure 18A:
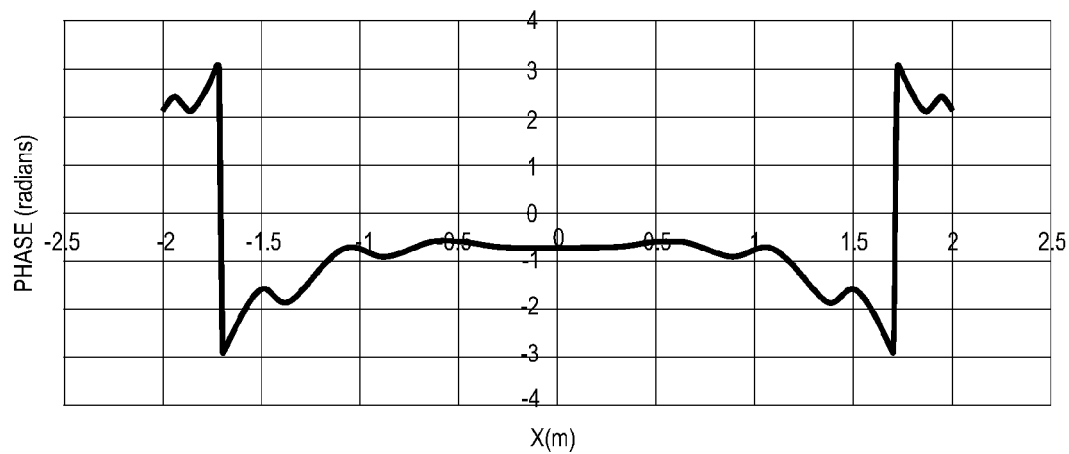
Figure 18B:
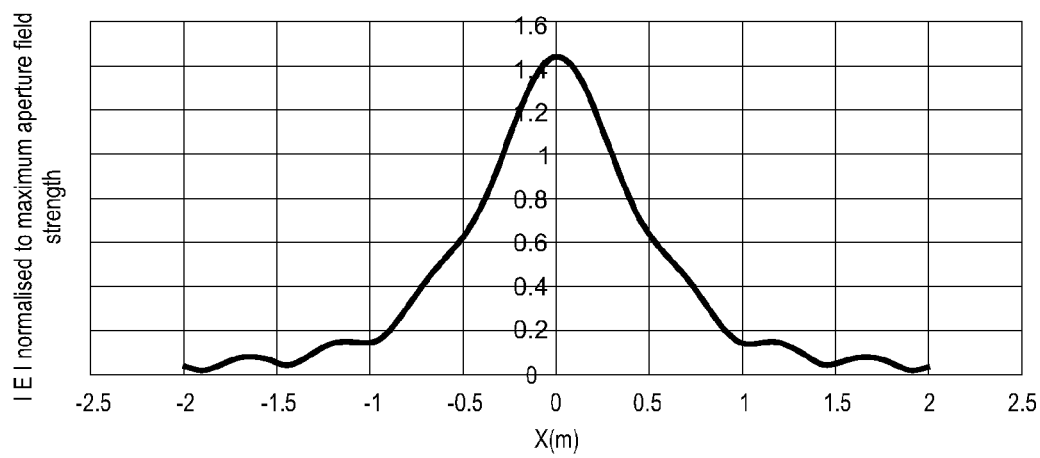

As with the unfocused case, the phase distribution across the beam at the range where the maximum field strength occurs is substantially plane. However, the amplitude of the field at this range has a narrower beam waist by virtue of focusing. The phase and amplitude plots at a range $R'_{max}$=17.2 m for this focused case are shown in FIGS. 18A and 18B, respectively, to illustrate these points. FIGS. 18A and 18B show phase distribution of electric field across beam at range=$R_{max}$=17.2 m; focused case with f=50 m.

Since the maximum field strength and planar wavefront for the focused case occur at a shorter range than without focusing, it may appear to be counterintuitive as to how focusing helps to extend the useful range for power transfer.

However, having reached a minimum at $R'_{max}$, the beam waist broadens once again as the range increases to a point where the original aperture field distribution is closely replicated. The range at which this occurs can be found by inspection of FIG. 17. The axial field strength attains its original value of unity (that of the maximum in the aperture plane) at a range of 39.6 m for the focused case.

By comparison, for the unfocused case, FIG. 15 shows that the on-axis field strength attains its original aperture field value of unity at a range of 32.4 m which is only 82% of the range for the same field strength using focusing.

Figure 19A:
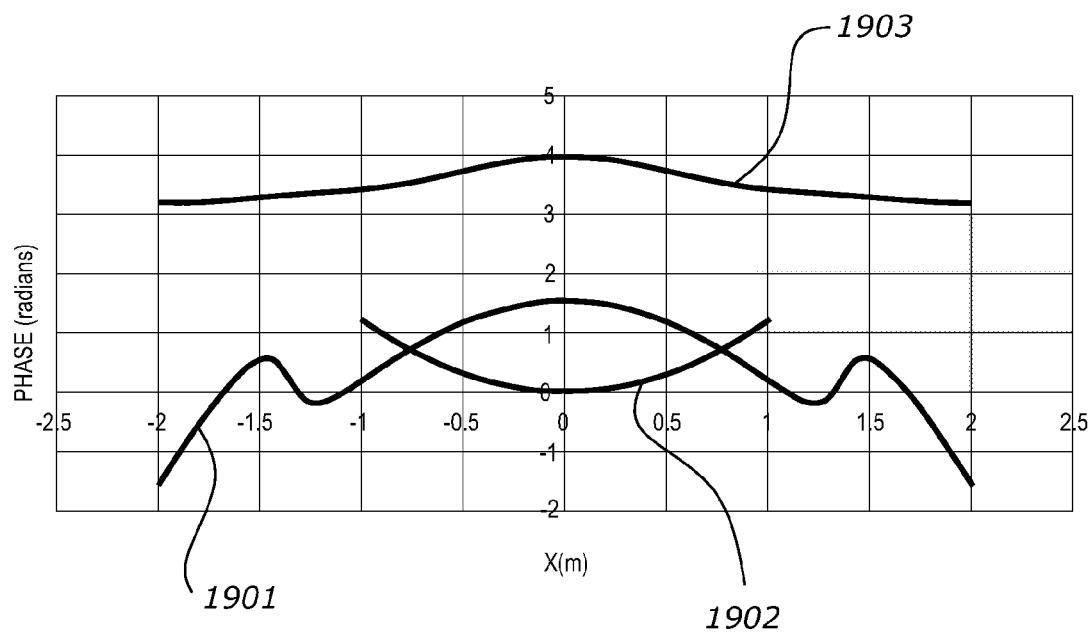
Figure 19B:
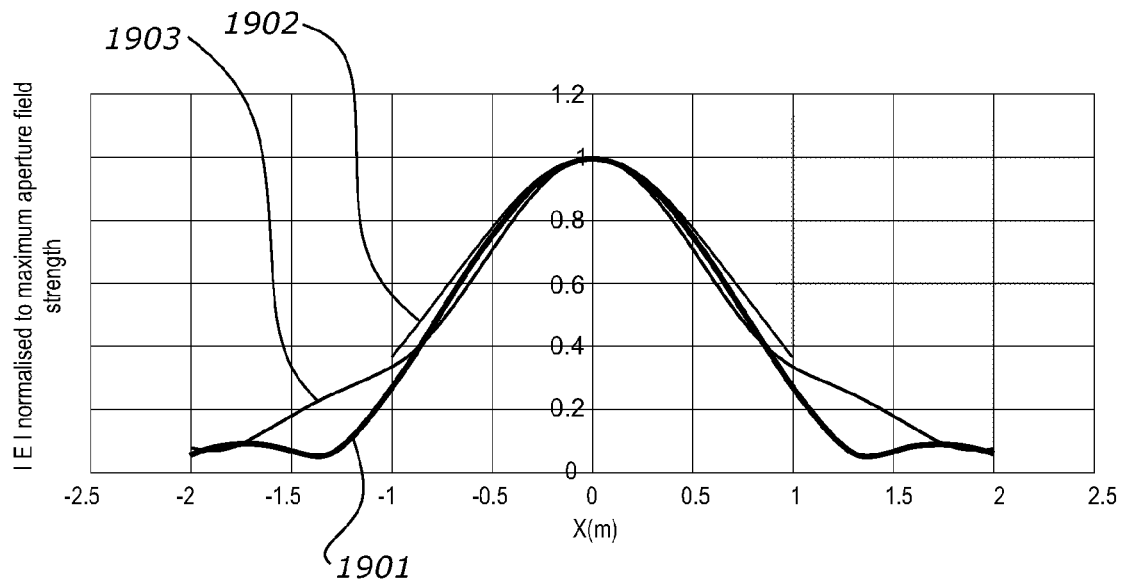

The phase and amplitude distributions across the beam for focused and unfocused cases are shown in FIGS. 19A and 19B, respectively, along with the distributions in the aperture plane of the transmitting antenna for comparison. FIGS. 19A and 19B show phase distribution of electric field across aperture plane; across transverse axis at range 39.6 m for focused case; at range 32.4 m for unfocused case. In FIG. 19A, D=1.92 m, frequency=5.8 GHz and f=50 m. In FIG. 19A, reference numerals 1901, 1902 and 1903 correspond to phase at 39.6 m (focused), phase in aperture plane, and phase at 32.4 m (unfocussed) respectively. Similarly, in FIG. 19B reference numerals 1901, 1902 and 1903 correspond to field at 39.6 m range (focused), field in aperture plane, and field at 32.4 m (unfocussed) respectively.

It is apparent from FIG. 19B that the amplitude of the focused field across the beam at a range of 39.6 m closely resembles that of the aperture field and is more tightly confined across the transverse plane than the unfocused case at a range of 32.4 m.

The focused distribution in FIG. 19B can be thought of as an image of the aperture-plane field distribution. The phase of this field at this range, shown in FIG. 19A, is similar to that in the aperture plane (with the focusing phase taper applied) except for having the opposite sense. That is, a convex phase front in the aperture plane has become a concave one of similar curvature at the extended range of 39.6 m—an example of phase conjugation.

The curvature of the phase front for the unfocused case in FIG. 19A at a range of 32.4 m is quite different from that of the focused field and aperture plane.

Therefore, the useful range for power transfer using a microwave beam in the radiating near-field can be increased by focusing a Gaussian distribution in the manner as described above.

The example shown allows a rectenna of similar-sized aperture to the transmitting antenna to be placed at a range of 39.6 m when the focusing technique is used, compared to 32.4 m without focusing—an increase of 22% in this example. In addition, the field amplitude distribution across the beam for the focused case more closely replicates that of the aperture field and is more tightly confined (less spill over) than that of the unfocused example having the same peak amplitude.

Equally important from a practical viewpoint, for a given range between transmitter and receiver, this focusing technique can be used as a way to reduce the aperture area of the antennas by this same factor.

Figure 20A:
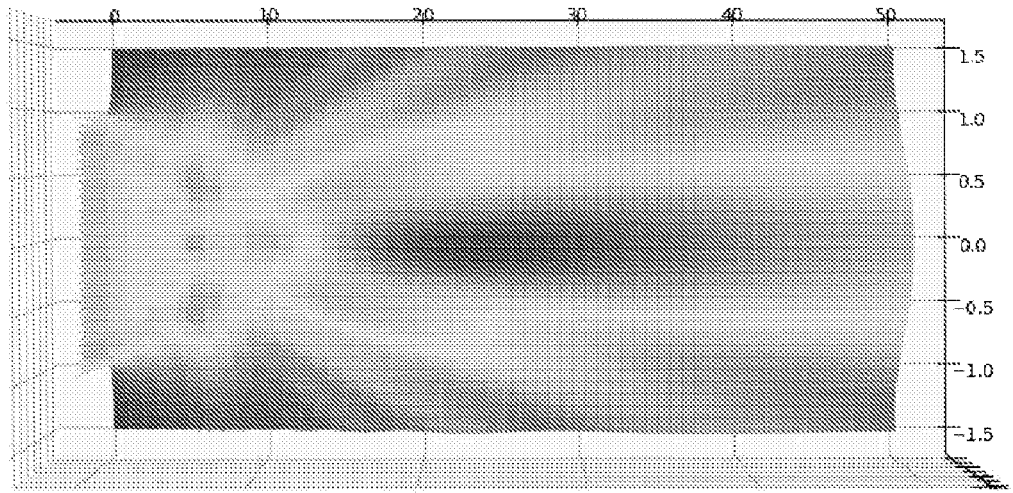
Figure 20B:
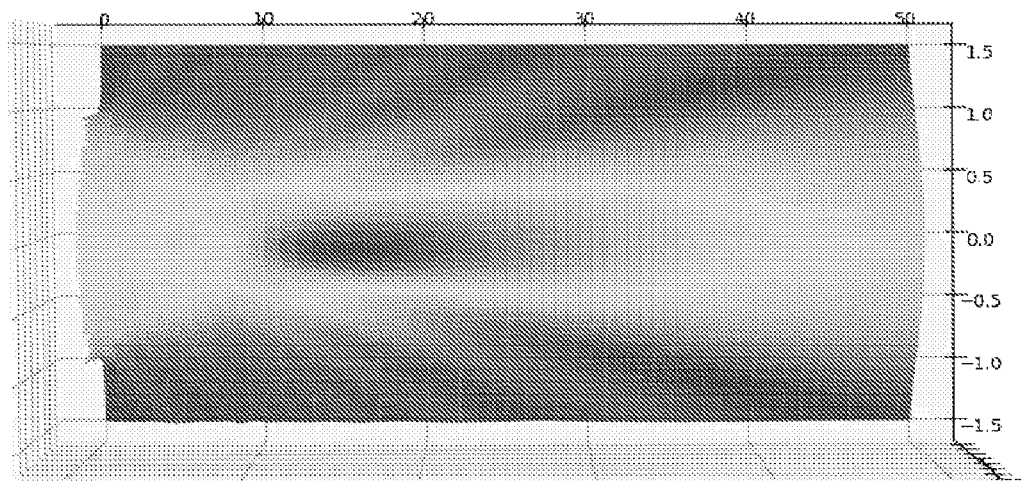

To illustrate the spatial distribution of the electric field strength in the unfocused and focused cases, FIGS. 20A and 20B on the following page show contour plots in a horizontal plane for the system described previously. FIG. 20A shows relative electric field strength contours in a horizontal plane through beam. FIG. 20B shows relative electric field strength contours in a horizontal plane through beam. FIG. 20B is a focussed case with f being 50 m.

Where in the foregoing description reference has been made to elements or integers having known equivalents, then such equivalents are included as if they were individually set forth.

It will of course be realised that while the foregoing description has been given by way of illustrative example(s) of the present invention, all such modifications and variations thereto as would be apparent to a person skilled in the art are deemed to fall within the broad scope and ambit of the various aspects of invention as is hereinbefore described and/or defined in the claims.

The invention claimed is:

1. A long-range wireless power transfer system comprising:
   a transmitting antenna that is configured to operate in a radiating near-field region, the transmitting antenna being a phased array antenna having an array of antenna elements that are radiating elements, the phased array antenna being configured to receive electric power from a power source as an input, convert the input electric power into electromagnetic energy, and radiate the electromagnetic energy into free space as a directional beam that is a collimated or substantially collimated beam in the near-field region, the collimated or substantially collimated beam being produced by controlling phase and amplitude of each of the antenna elements to achieve a spherical phase distribution across an aperture plane of the transmitting antenna, thereby focusing and enhancing a range of the collimated or substantially collimated beam towards a rectifying antenna; and
   the rectifying antenna positioned or configured to be positioned at a distance from the transmitting antenna that is within the near-field region, the rectifying antenna configured to receive the directional beam and convert the electromagnetic energy into electricity.

2. The system as claimed in claim 1, wherein each antenna element has an electronically controlled phase shifter to facilitate electronic steering of the directional beam.

3. The system as claimed in claim 1, wherein each antenna element is a radome element formed as a hemispherical shell or a substantially hemispherical shell.

4. The system as claimed in claim 1, further comprising at least one phase correcting device positioned or configured to be positioned at a first distance from the transmitting antenna and at a second distance from the rectifying antenna, the at least one phase correcting device being a multi-layer structure having at least three layers with a central dielectric core sandwiched between at least two layers on two opposite portions of the dielectric core with at least one of the layers being a dielectric skin made of at least one dielectric material, the at least one phase correcting device being configured to:
   receive the directional beam radiated from the transmitting antenna in the radiating near-field region,
   perform a phase correcting operation on the directional beam, the phase correcting operation being maintaining the directional beam as the collimated beam and increasing a range to which the directional beam is maintained as the collimated or substantially collimated beam, and
   transmit the phase corrected directional beam toward the rectifying antenna; wherein the rectifying antenna is configured to receive the directional beam from the phase correcting device in the radiating near-field region.

5. The system as claimed in claim 4, wherein the at least one phase correcting device is a straight through phase correcting device that allows the directional beam that is incident on it to travel through in a straight direction.

6. The system as claimed in claim 4, wherein the at least one dielectric skin comprises metasurface to simultaneously provide phase shift whilst maintaining an impedance matched structure for minimal loss of power.

7. The system as claimed in claim 4, wherein the central dielectric core is of at least three layers with at least one metamaterial layer or metasurface sandwiched between two dielectric support layers.

8. The system as claimed in claim 4, wherein the at least one phase correcting device is a reflective phase correcting device that allows the directional beam to divert to another direction at an angle by reflecting the directional beam that is incident on the reflective phase correcting device into said another direction.

9. The system as claimed in claim 8, wherein in the reflective phase correcting device the dielectric core is sandwiched between the at least two layers on two opposite portions of the dielectric core with at least one of the layers being the dielectric skin the other layer being a reflective ground plane.

10. The system as claimed in claim 1, wherein the rectifying antenna is part of a rectifying antenna structure comprising solid state rectifying components wherein the rectifying antenna comprises an array of receiving antenna elements that are electrically connected to the solid-state rectifying components.

11. The system as claimed in claim 10, wherein the solid-state rectifying components are Schottky diodes.

12. The system as claimed in claim 1, wherein the rectifying antenna is part of a rectifying antenna structure, the rectifying antenna structure comprising:
   a central core having a first portion and a second portion that are opposite to each other, wherein the central core is made of at least one dielectric material;
   a dielectric skin comprising a metasurface disposed to a first portion of the central core and the rectifying antenna is positioned at the second portion of the central core; and
   a rectifying circuit that is electrically connected to the rectifying antenna to rectify the incoming electromagnetic energy to produce a direct current (DC).

13. The system as claimed in claim 4, wherein the at least one phase correcting device utilizes at least two metasurfaces to provide phase shift whilst maintaining an impedance matched structure for minimal loss of power.

14. The system as claimed in claim 12, wherein thickness of the central core lies between one-tenth and one whole wavelength in the dielectric material that the central core is made of.

15. The system as claimed in claim 12, wherein the central core has a refractive index of between 1 and 3.

16. The system as claimed in claim 12, wherein thickness and refractive index of the central core vary over the surface of the rectifying antenna to achieve impedance match.

17. A range enhancement device for use in a long-range wireless power transfer system, said device being configured to be positioned between a transmitting phased array antenna and a rectifying antenna, the device comprising:
   a phase correcting device configured to be positioned at a first distance from the transmitting phased array antenna, wherein the transmitting phased array antenna is configured to operate in a radiating near-field region and radiate electromagnetic energy into free space as a directional beam that is a collimated or substantially collimated beam, the collimated or substantially collimated beam being produced by controlling phase and amplitude of each of the antenna elements to achieve spherical phase distribution across an aperture plane of the transmitting antenna, thereby focusing and enhancing a range of the collimated or substantially collimated beam towards a rectifying antenna, said first distance being within the radiating near-field region, the phase correcting device being configured to:
- receive in the radiating near-field region a directional beam radiated from the transmitting phased array antenna,
- perform a phase correcting operation on the received directional beam for maintaining the directional beam as a substantially collimated beam, and
- transmit the phase corrected directional beam to free space as a substantially collimated beam, wherein the phase correcting device comprises at least one metasurface to provide phase shift while maintaining an impedance matched structure.

18. The range enhancement device of claim 17, wherein said metasurface maintains said impedance matched structure for minimal loss of power.

19. The range enhancement device of claim 17, wherein the device comprises a multi-layer structure having at least a central dielectric core between at least two layers on two opposite portions of the dielectric core with at least one of the layers being a dielectric skin made of at least one dielectric material.

20. The range enhancement device as claimed in claim 19, wherein in the reflective phase correcting device the dielectric core is sandwiched between the at least two layers on two opposite portions of the dielectric core with at least one of the layers being the dielectric skin the other layer being a reflective ground plane.

21. The range enhancement device of claim 17, wherein the at least one phase correcting device is a straight through phase correcting device that allows the directional beam that is incident on it to travel through in a straight direction.

22. The range enhancement device of claim 17, wherein the at least one phase correcting device is a reflective phase correcting device that allows the directional beam to divert to another direction at an angle by reflecting the directional beam that is incident on the reflective phase correcting device into said another direction.

23. The range enhancement device of claim 17, wherein the phase correcting device is angled or configured to be angled with respect to the incident directional beam, such that the resultant directional beam is reflected substantially 90 degrees with respect to the incident directional beam.

24. A method of long-range wireless power transfer configured to operate in the radiating near-field region comprising:
- at a transmitting side:
  - receiving electric power from a power source as an input;
  - converting the input electric power into electromagnetic energy;
  - radiating the converted electromagnetic energy into free space as a directional beam that is a collimated or substantially collimated beam in the near-field region by a transmitting antenna comprising a phased array antenna having an array of radiating antenna elements, said collimated or substantially collimated beam being radiated by controlling phase and amplitude at each of the radiating antenna elements to achieve spherical phase distribution across an aperture plane of the transmitting antenna, thereby focusing and enhancing a range of the collimated or substantially collimated beam towards a rectifying antenna; and
- at a receiving side:
  - receiving a directional beam in the radiating near-field region at the rectifying antenna;
  - converting by the rectifying antenna the electromagnetic energy in the received directional beam into electricity.

25. The method of claim 24, further comprising:
receiving a directional beam in the radiating near-field region by a phase correcting device;
performing a phase correcting operation on the received directional beam by the phase correcting device, the phase correcting operation being maintaining the directional beam as a collimated beam; and
transmitting the phase corrected directional beam toward said rectifying antenna.

* * * * *